US012126246B2

(12) United States Patent
Li et al.

(10) Patent No.: US 12,126,246 B2
(45) Date of Patent: Oct. 22, 2024

(54) METHOD FOR SOLVING FOR CONVERTER VALVE STATES AND VALVE CURRENTS BASED ON VALVE-SIDE CURRENT TIMING CHARACTERISTICS

(71) Applicant: South China University of Technology, Guangzhou (CN)

(72) Inventors: Xiaohua Li, Guangzhou (CN); Shanshan Yin, Guangzhou (CN); Jiewen Li, Guangzhou (CN); Dui Liu, Guangzhou (CN); Hao Li, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/036,537

(22) PCT Filed: Sep. 30, 2021

(86) PCT No.: PCT/CN2021/122020
§ 371 (c)(1),
(2) Date: May 11, 2023

(87) PCT Pub. No.: WO2022/148074
PCT Pub. Date: Jul. 14, 2022

(65) Prior Publication Data
US 2023/0396143 A1 Dec. 7, 2023

(30) Foreign Application Priority Data
Jan. 6, 2021 (CN) .......................... 202110011319.4

(51) Int. Cl.
*H02M 1/00* (2007.01)
(52) U.S. Cl.
CPC ....... *H02M 1/0012* (2021.05); *H02M 1/0009* (2021.05)

(58) Field of Classification Search
CPC .. H02M 1/0012; H02M 1/0009; H02M 7/537; H02M 7/538; H02M 7/5387; H02H 1/00; H02H 1/007; H02H 7/26; H02J 3/00
See application file for complete search history.

(56) References Cited

U.S. PATENT DOCUMENTS

| 5,627,735 A | * | 5/1997 | Bjorklund | .............. H02J 3/36 363/35 |
| 2013/0154394 A1 | * | 6/2013 | Mildenstein | .............. G05F 1/46 307/131 |

(Continued)

FOREIGN PATENT DOCUMENTS

| CN | 101944721 A | * | 1/2011 |
| CN | 104377691 A | * | 2/2015 |

(Continued)

OTHER PUBLICATIONS

International Search Report and Written Opinion dated Dec. 30, 2021, for International Application PCT/CN2021/122020.

(Continued)

*Primary Examiner* — Thienvu V Tran
*Assistant Examiner* — Yahveh Comas Torres
(74) *Attorney, Agent, or Firm* — The Dobrusin Law Firm, P.C.

(57) ABSTRACT

The present invention discloses a calculation method for a converter valve state and a valve current based on temporal features of a valve side current, the process is follows: collecting three-phase AC currents, DC currents on a valve side of a converter of a DC transmission system, and trigger pulses of converter valves; establishing a node current equation of the AC currents and valve currents; when detecting a rising edge of a trigger pulse of a converter valve, latching the number of the converter valve; according to the trigger pulses of the converter valves, and amplitude characteristics of the AC currents and characteristics of AC (Continued)

variations, to perform a conducting state and a blocking state judgment of valve states, and obtaining valve states; judging whether each phase has a bypass state; through summing the valve bypass states of the three phases to judge a number of bypass phases; supplementing bypass loop voltage equation; calculating the converter valve currents; when the calculated value of the valve currents is negative, the valve state is corrected to blocking state according to a one-way conductivity of the converter valves, otherwise do not correct; repeating the above steps again to calculate the valve current.

4 Claims, 14 Drawing Sheets

(56) References Cited

U.S. PATENT DOCUMENTS

| 2018/0026550 | A1 | 1/2018 | Dent | |
| 2022/0365125 | A1* | 11/2022 | Li | H02M 7/162 |
| 2022/0397615 | A1* | 12/2022 | Li | H02M 1/0009 |

FOREIGN PATENT DOCUMENTS

| CN | 104764991 | A | * | 7/2015 | |
| CN | 104866689 | A | * | 8/2015 | Y02E 60/00 |
| CN | 108647396 | A | * | 10/2018 | G06F 30/23 |
| CN | 110323773 | A | * | 10/2019 | H02J 3/36 |
| CN | 110865225 | A | | 3/2020 | |
| CN | 111157827 | A | * | 5/2020 | G01R 31/00 |
| CN | 111239471 | A | | 6/2020 | |
| CN | 111596160 | A | | 8/2020 | |
| CN | 111239471 | B | * | 2/2021 | G01R 19/16547 |
| CN | 112769132 | A | | 5/2021 | |
| CN | 112993994 | A | * | 6/2021 | H02J 3/001 |
| DE | 102013215247 | B4 | * | 2/2019 | H02M 7/539 |
| WO | 2014/153985 | A1 | | 10/2014 | |

OTHER PUBLICATIONS

Liang; Predictive Analysis for Radiated Electromagnetic Disturbance in MMC-HVDC Valve Hall; dated Jun. 2, 2020.

* cited by examiner

METHOD FOR SOLVING FOR CONVERTER VALVE STATES AND VALVE CURRENTS BASED ON VALVE-SIDE CURRENT TIMING CHARACTERISTICS

TECHNICAL FIELD

The invention relates to the technical field of electric power systems and their automation, in particular to a calculation method for a converter valve state and a valve current based on temporal features of a valve side current.

TECHNICAL BACKGROUND

Converter valves are the core equipment of LCC-HVDC DC project, which undertake the function of mutual conversion between AC and DC. AC fault easily lead to commutation failure of converter valves. The current distribution of each converter valve is uneven. The valve with commutation failure is in an overcurrent or overheated state for a long time, which is extremely detrimental to the safety of the valve equipment, and will cause equipment to burn out or reduce its service life. From the safety point of view of the converter valves, accurate acquisition of the valve state and valve current during the entire operation process is the precondition for protecting valve equipment and controlling coordination.

Due to the technological design of equipment heat dissipation and insulation etc., it is not possible to install measuring elements inside a converter valve of an actual power grid DC project to directly measure the valve current. Only the DC electrical quantity and the AC electrical quantity measured by the current transformer outside the converter valve can indirectly represent the current conducting state of the converter valve and the operating state of the converter valve. During normal operation, the upper and lower bridge arms of the same phase will not be turned on at the same time. According to the operating law that the current flows in from the high potential valve and flows out from the low potential, the valve current and valve state can be calculated by the polarity characteristics of the measured AC current. However, when an AC fault occurs, the upper and lower arms of the same phase may be turned on at the same time. When a converter valve operates with a single phase bypass or multiple phase bypasses, it is impossible to obtain the current and valve state of the converter valve only by using the polarity characteristics of the AC current.

SUMMARY OF THE INVENTION

The purpose of the present invention is to calculate the above-mentioned defects in the current technology and at the same time to reduce the dependence on voltage, to provide a calculation method for a converter valve state and a valve current based on temporal features of a valve side current. The valve state and valve current obtained by this method may provide strong support for fault analysis and control and protection optimization of DC project.

The purpose of the present invention may be achieved by adopting the following technical solutions:

A calculation method for a converter valve state and a valve current based on temporal features of a valve side current, the calculation method comprising following steps:

S1. collecting three-phase AC currents $i_a$, $i_b$, $i_c$ and DC currents $i_{dH}$, $i_{dN}$ on a converter valve side of a DC transmission system, and trigger pulses $FP_1$, $FP_2$, $FP_3$, $FP_4$, $FP_5$, $FP_6$ of converter valves;

S2. according to a topology structure of the converter of the DC transmission system, establishing a node current equation $Ai=y$ of the three-phase AC currents $i_a$, $i_b$, $i_c$, the DC currents $i_{dH}$, $i_{dN}$ and valve currents $i_{VTm}$ on the valve side;

$$\begin{cases} i_{VT2} + i_{VT4} + i_{VT6} = i_{dH} \\ i_{VT1} + i_{VT3} + i_{VT5} = i_{dN} \\ i_{VT4} - i_{VT1} = i_a \\ i_{VT6} - i_{VT3} = i_b \\ i_{VT2} - i_{VT5} = i_c \end{cases} \quad (G1)$$

wherein $A = \begin{bmatrix} 0 & 1 & 0 & 1 & 0 & 1 \\ 1 & 0 & 1 & 0 & 1 & 0 \\ -1 & 0 & 0 & 1 & 0 & 0 \\ 0 & 0 & -1 & 0 & 0 & 1 \\ 0 & 1 & 0 & 0 & -1 & 0 \end{bmatrix}$, $i = \begin{bmatrix} i_{VT1} \\ i_{VT2} \\ i_{VT3} \\ i_{VT4} \\ i_{VT5} \\ i_{VT6} \end{bmatrix}$, $y = \begin{bmatrix} i_{dH} \\ i_{dN} \\ i_a \\ i_b \\ i_c \end{bmatrix}$, A is a valve current coefficient matrix, i is a valve current vector, y is a current vector at both ends of the valve side, $i_{VTm}$ are respective six converter valve currents, m is a number of six converter valves, m=1, 2, 3, 4, 5, 6;

S3. according to the trigger pulses $FP_1$, $FP_2$, $FP_3$, $FP_4$, $FP_5$, $FP_6$ of the converter valves obtained in step S1, when detecting a rising edge of a trigger pulse of a converter valve, latching the number m of the converter valve into a register;

S4. according to the trigger pulses $FP_1$, $FP_2$, $FP_3$, $FP_4$, $FP_5$, $FP_6$ of the converter valves obtained in step S1, and amplitude characteristics of the AC currents and characteristics of AC variations, to perform a conducting state and a blocking state judgment of valve states, and obtaining six valve states of the converter valves $s_{VT1}$, $s_{VT2}$, $s_{VT3}$, $s_{VT4}$, $s_{VT5}$, $s_{VT6}$;

S5. according to the valve states obtained in step S4, constructing a valve state matrix S:

$$S = \begin{bmatrix} s_{VT1} & & & & & \\ & s_{VT2} & & & & \\ & & s_{VT3} & & & \\ & & & s_{VT4} & & \\ & & & & s_{VT5} & \\ & & & & & s_{VT6} \end{bmatrix}; \quad (G2)$$

in the formula: $s_{VT1}$, $s_{VT2}$, $s_{VT3}$, $s_{VT4}$, $s_{VT5}$, $s_{VT6}$ are the valve states of the six converter valves;

S6. by calculating a product of an upper valve state and a lower valve state of each phase, judging whether each phase has a bypass state, valve bypass states $S_a$, $S_b$, $S_c$ of each phase are:

$$\begin{cases} S_a = s_{VT1} \times s_{VT4} \\ S_b = s_{VT3} \times s_{VT6} \\ S_c = s_{VT2} \times s_{VT5} \end{cases} \quad (G3)$$

in the formula: $S_a$ represents a valve bypass state of phase a, $S_b$ represents a valve bypass state of phase b, $S_c$ represents a valve bypass state of phase c, $S_k=1$ represents a bypass, $S_k=0$ represents no bypass, and k is serial numbers of a, b, and c phases;

S7. summing the valve bypass states of the three phases to judge a number of bypass phases, where a number of bypass phases $S_{total}$ is expressed as follows:

$$S_{total} = \Sigma(S_a + S_b + S_c) \quad (G4);$$

in the formula: $S_{total}$ represents the number of bypass phases in the three phases abc;

S8. according to the number of bypass phases and corresponding phases obtained in step S7, supplementing a bypass loop voltage equation $C_p i=D_p$; wherein $C_p$ is a coefficient matrix of the bypass loop voltage equation, i is a valve current vector, $D_p$ is a constant vector, and p is serial number of the bypass phases;

S9. according to step S2 and step S8, and in conjunction with step S4, calculating the valve currents $i_{VTm}$;

S10. when the valve currents $i_{VTm}$ calculated in step S9<0, considering a one-way conductivity of the converter valves, correcting the valve states, correcting the valve states to blocking state $s_{VTm}=0$, otherwise, do not correct;

S11. repeating steps S5 to S10 until the valve currents $i_{VTm} \geq 0$ is calculated.

Further, processes of step S4 are as follows:

S41. when it is detected in step S1 that the trigger pulses of the converter valves are at a high electric level and a conducting state criterion of the converter valves is satisfied, setting the valve states $s_{VTm}=1$, wherein the conducting state of the converter valves is: an amplitude $|i_k|$ of an AC current of the phase where the converter valve numbered m is located is greater than a fixed value of an AC current, namely:

$$|i_k|>I_{set3} \tag{G5}$$

in the formula: $i_k$ is a, b, c three-phase AC currents, $I_{set3}$ is the AC current fixed value;

S42. when the converter valve numbered m is in a conducting state $s_{VTm}=1$, if the AC current meets a blocking state criterion, then the converter valve numbered m is in a blocking state $s_{VTm}=0$; otherwise, the converter valve numbered m continues to maintain the conducting state $s_{VTm}=1$, wherein the blocking state criterion of the converter valve is: the amplitude $|i_k|$ of the AC current of the phase where the converter valve numbered m is located is less than a blocking state current threshold fixed value, and a variation rate of the AC current is less than a variation threshold fixed value, namely:

$$|i_k| < I_{set4} \text{ and } \frac{|i_{k(t)} - i_{k(t-\Delta t)}|}{\Delta t} < I_{set5} \tag{G6}$$

in the formula: $I_{set4}$ is the blocking state current threshold fixed value, $I_{set5}$ is the variation threshold fixed value;

S43. when only an upper valve and a lower valve of a single-phase are conducting, the converter valves operate as a single-phase bypass pair, and the two valves of the bypass pair are judged to be in the conducting state, a single-phase bypass pair judgment condition is: a maximum value of the DC currents minus a maximum value of absolute values of the AC currents is greater than a commutation failure threshold fixed value, and the maximum value of the absolute values of the AC currents is less than a single-phase bypass pair threshold fixed value, namely:

$$\begin{cases} \max(i_{dH}, i_{dN}) - \max(|i_a|, |i_b|, |i_c|) > I_{set1} \\ \max(|i_a|, |i_b|, |i_c|) < I_{set2} \end{cases} \tag{G7}$$

in the formula: $I_{set1}$ is the commutation failure threshold fixed value, $I_{set2}$ is the single-phase bypass pair threshold fixed value;

S44. when the AC and DC currents satisfy formula (G7) of step S43, the converter valves operate as a single-phase bypass pair, wherein a valve state judgment condition of the single-phase bypass pair is:

1) when bypass state flags of all valves $s_{bypass\_m}=0$, if a register signal in step S3 is equal to m, a phase where the converter valve numbered m is located is a bypass phase, setting the bypass state flags of the two valves in the bypass phase equal to 1, keeping the two valves of the bypass phase in the conducting state, namely: $s_{bypass\_m}=1$ and $s_{bypass\_(mod(m+3,6))}=1$, $s_{VTm}=1$ and $s_{VT(mod(m+3,6))}=1$;

2) when the bypass status flags of the phase where the converter valve numbered m is located is $s_{bypass\_m}=1$ or $s_{bypass\_(mod(m+3,6))}=1$, keeping the two valves of the phase where the converter valve numbered m is located in the conducting state.

Further, processes of step S8 are as follows:

S81. according to the number of bypass phases obtained in step S7, when the number of bypass phases $S_{total} \leq 1$, the converter valves operate without a bypass pair or one phase bypass pair, at this time, there is no need to construct the bypass loop voltage equation, skip to step S91, otherwise, go to step S82;

S82. when the number of bypass phases $S_{total}=2$, it indicates that two phase bypass pairs of the converter valves operate, supplementing the bypass loop voltage equation $C_p i=D_p$, skip to step S92; otherwise, go to step S83; wherein, 1) if $S_a=S_b$, then a following relationship exists:

$$i_{VT1}+i_{VT4}=i_{VT3}+i_{VT6} \tag{G8}$$

supplementing the bypass loop voltage equation $C_{ab}i=D_{ab}$, wherein $C_{ab}=[1\ 0\ -1\ 1\ 0\ -1]$, $D_{ab}=[0]$, p=ab, $C_{ab}$ is a coefficient matrix of the bypass loop voltage equation when the ab phases bypass, $D_{ab}$ is a constant vector of the bypass loop voltage equation when the ab phases bypass;

2) if $S_a=S_c$, then a following relationship exists:

$$i_{VT1}+i_{VT4}=i_{VT2}+i_{VT5} \tag{G9}$$

supplementing the bypass loop voltage equation $C_{ac}i=D_{ac}$, wherein $C_{ac}=[1\ -1\ 0\ 1\ -1\ 0]$, $D_{ac}=[0]$, p=ac, $C_{ac}$ is a coefficient matrix of the bypass loop voltage equation when the ac phases bypass, $D_{ac}$ is a constant vector of the bypass loop voltage equation when the ac phase bypass;

3) if $S_b=S_c$, then a following relationship exists:

$$i_{VT2}+i_{VT5}=i_{VT3}+i_{VT6} \tag{G10}$$

supplementing the bypass loop voltage equation $C_{bc}i=D_{bc}$, wherein $C_{bc}=[0\ 1\ -1\ 0\ 1\ -1]$, $D_{bc}=[0]$, p=bc, $C_{bc}$ is a coefficient matrix of the bypass loop voltage equation when the bc phases bypass, $D_{bc}$ is a constant vector of the bypass loop voltage equation when the bc phase bypass;

S83. when the number of bypass phases $S_{total}=3$, it indicates that three phase bypass pairs of the converter valves operate, supplementing the bypass loop voltage equation $C_p i=D_p$, skip to step S92; at the same time, a following relationship exists:

$$\begin{cases} i_{VT1} + i_{VT4} = i_{VT3} + i_{VT6} \\ i_{VT1} + i_{VT4} = i_{VT2} + i_{VT5} \end{cases} \quad (G11)$$

supplementing the bypass loop voltage equation $C_{abc}i = D_{abc}$, wherein $$C_{abc} = \begin{bmatrix} 1 & -1 & 0 & 1 & -1 & 0 \\ 1 & 0 & -1 & 1 & 0 & -1 \end{bmatrix},$$

$D_{abc} = [0\ 0]^T$, p=abc, $C_{abc}$ is a coefficient matrix of the bypass loop voltage equation when the abc phases bypass, $D_{abc}$ is a constant vector of the bypass loop voltage equation when the abc phases bypass;

processes of step S9 are as follows:

S91. constructing a state equation based on valve state characteristics ASi=y, inverting its coefficient matrix to calculate the valve current $i_{VTm}$:

$$i = (AS)^{-1} \times y \quad (G12)$$

in the formula: $i = [i_{VT1}\ i_{VT2}\ i_{VT3}\ i_{VT4}\ i_{VT5}\ i_{VT6}]^T$;

S92. combining Ai=y and $C_p i = D_p$, combining the valve state characteristics S to construct a state equation ESi=z, inverting its coefficient matrix, and calculating the valve current $i_{VTm}$:

$$i = (ES)^{-1} \times z \quad (G13)$$

in the formula: $i = [i_{VT1}\ i_{VT2}\ i_{VT3}\ i_{VT4}\ i_{VT5}\ i_{VT6}]^T$, $$E = \begin{bmatrix} A \\ C_p \end{bmatrix}, z = \begin{bmatrix} y \\ D_p \end{bmatrix}.$$

p is a serial number of a bypass phase, E is a coefficient matrix formed by the coefficient matrix A and the coefficient matrix $C_p$, z is a vector formed by the current vector y and the constant vector $D_p$ at both ends of the valve side.

Further, in step S3, when a rising edge of a trigger pulse of a converter valve is detected $FP_m(t) - FP_m(t - \Delta t) = 1$, latching the number m of the converter valve into the register; wherein $FP_m(t)$ is a trigger pulse signal of the converter valve numbered m at time t, $FP_m(t - \Delta t)$ is a trigger pulse signal of the converter valve numbered m at time $(t - \Delta t)$, t is a time at a certain moment, $\Delta t$ is a sampling time interval.

Compared with the current technology, the present invention has the following advantages and effects:

In HVDC transmission systems, there are many theoretical studies based on the converter valve current, such as commutation failure detection. However, the valve current cannot be directly measured and there is no suitable calculation method, so that the research results cannot be directly applied to the actual DC project, and can only stay in the theoretical research stage. According to the AC current and DC current at both ends of the converter valve and the signals that can be measured by the trigger pulse of the converter valve, the present invention can, not only accurately calculate the valve current through the node current equation and the one-way conductivity of the converter valve, but also judge the conducting and blocking state of the converter valve in real time. The monitoring of valve status and the accurate calculation of valve current are particularly important for existing theoretical research in practical project applications, and are of great significance to the protection and control of heavy structure converter valves.

DETAILED DESCRIPTION

In order to make the purposes, technical solutions and advantages of the embodiments of the present invention clearer, the technical solutions in the embodiments of the present invention will be clearly and completely described below with reference to the accompanying drawings of the embodiments of the present invention. Obviously, the described embodiments are some, but not all, embodiments of the present invention. Based on the embodiments of the present invention, all other embodiments obtained by those of ordinary skill in the art without creative efforts shall fall within the protection scope of the present invention.

Embodiments

The invention discloses a calculation method for a converter valve state and a valve current based on temporal features of a valve side current, and the method is used to judge the valve state and calculate the valve current in actual power grid project. The operating conditions of the converter valve after an AC fault change differently. In order to more comprehensively cover the operating conditions of the converter valve after the fault, this embodiment takes a three-phase fault of a six-pulse inverter side commutation bus as an example. The present invention will be further described in detail according to FIGS. 1 and 2.

Figure 3:
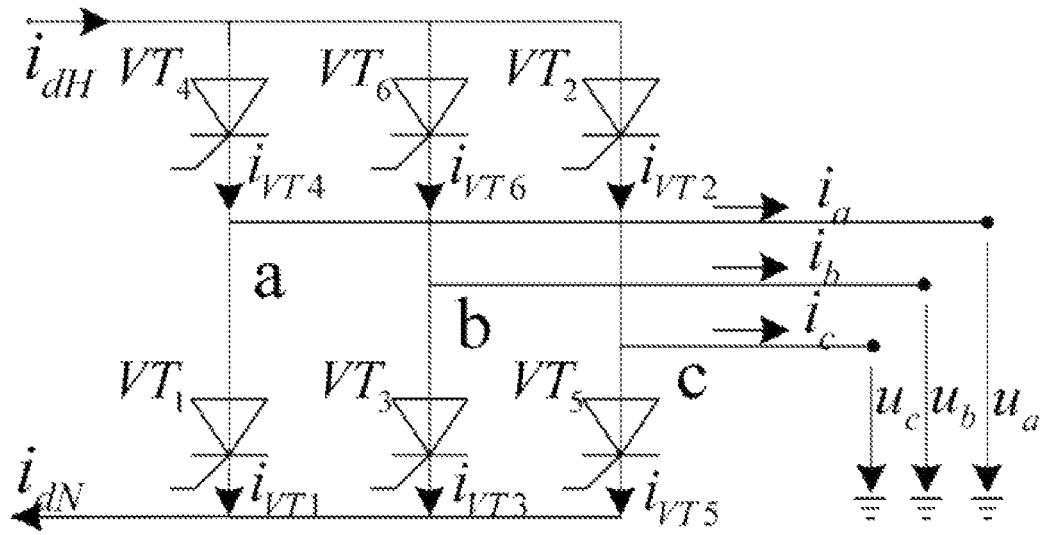
FIG. 3 is an illustrative diagram of a converter valve for a high-voltage DC transmission of the present invention, wherein $i_a$, $i_b$, $i_c$ are the a phase, b phase, and c phase of a three-phase AC current, $i_{dH}$ is a high-voltage side DC current, $i_{dN}$ is a low-voltage side DC current, $i_{VT1}\ i_{VT2}\ i_{VT3}\ i_{VT4}\ i_{VT5}\ i_{VT6}$ are valve currents, directions indicated by arrows in the figure is positive currents.
Figure 4:
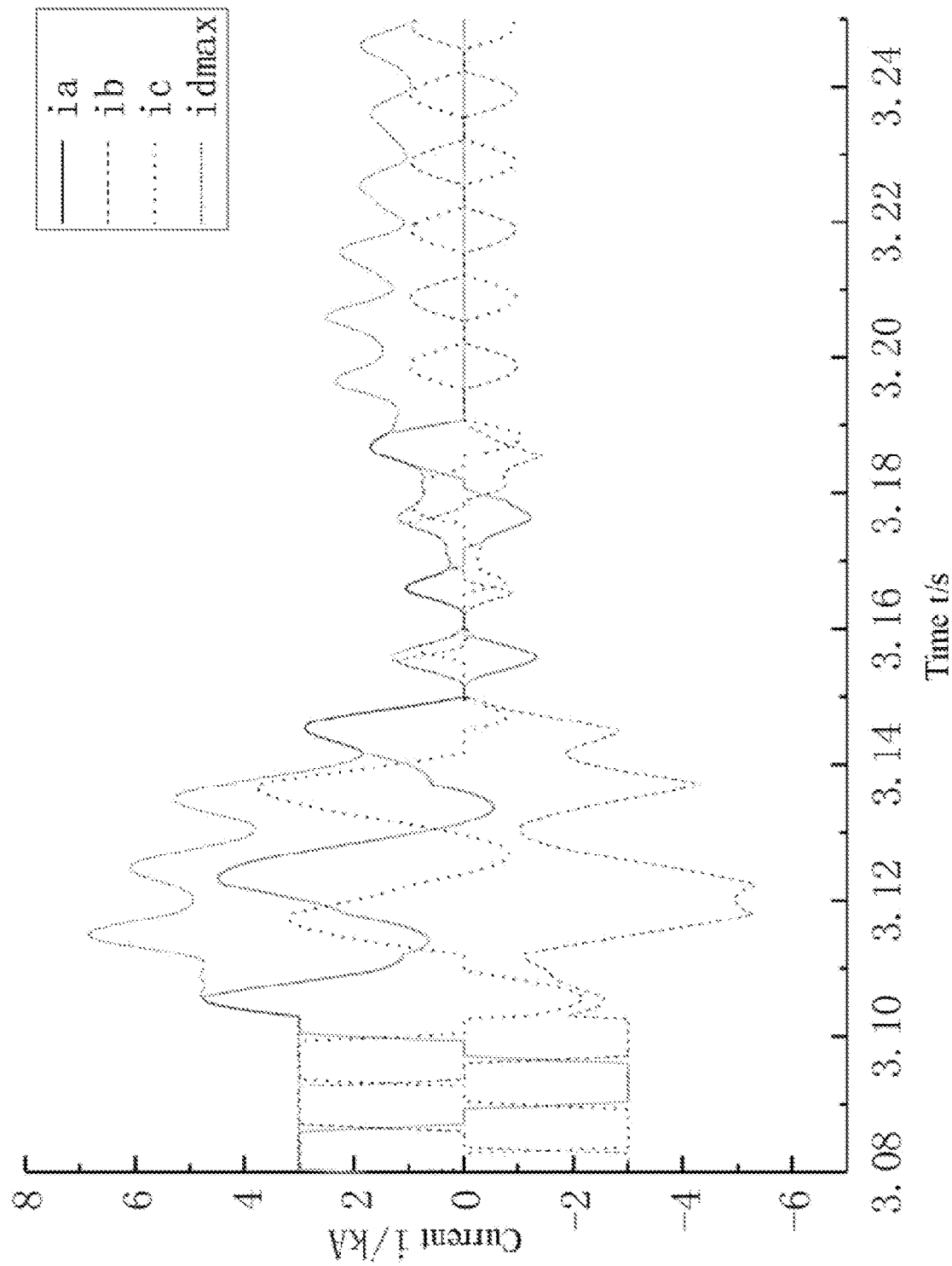
FIG. 4 are waveforms of three-phase AC currents $i_a$, $i_b$, $i_c$, and a DC current $i_{d\ max}$ on a valve side of a converter valve of the present invention, and the DC current $i_{d\ max}$ is the maximum value of the high-voltage side DC current $i_{dH}$ and the low-voltage side DC current $i_{dN}$, that is $i_{d\ max} = \max(i_{dH}, i_{dN})$.
Figure 5:
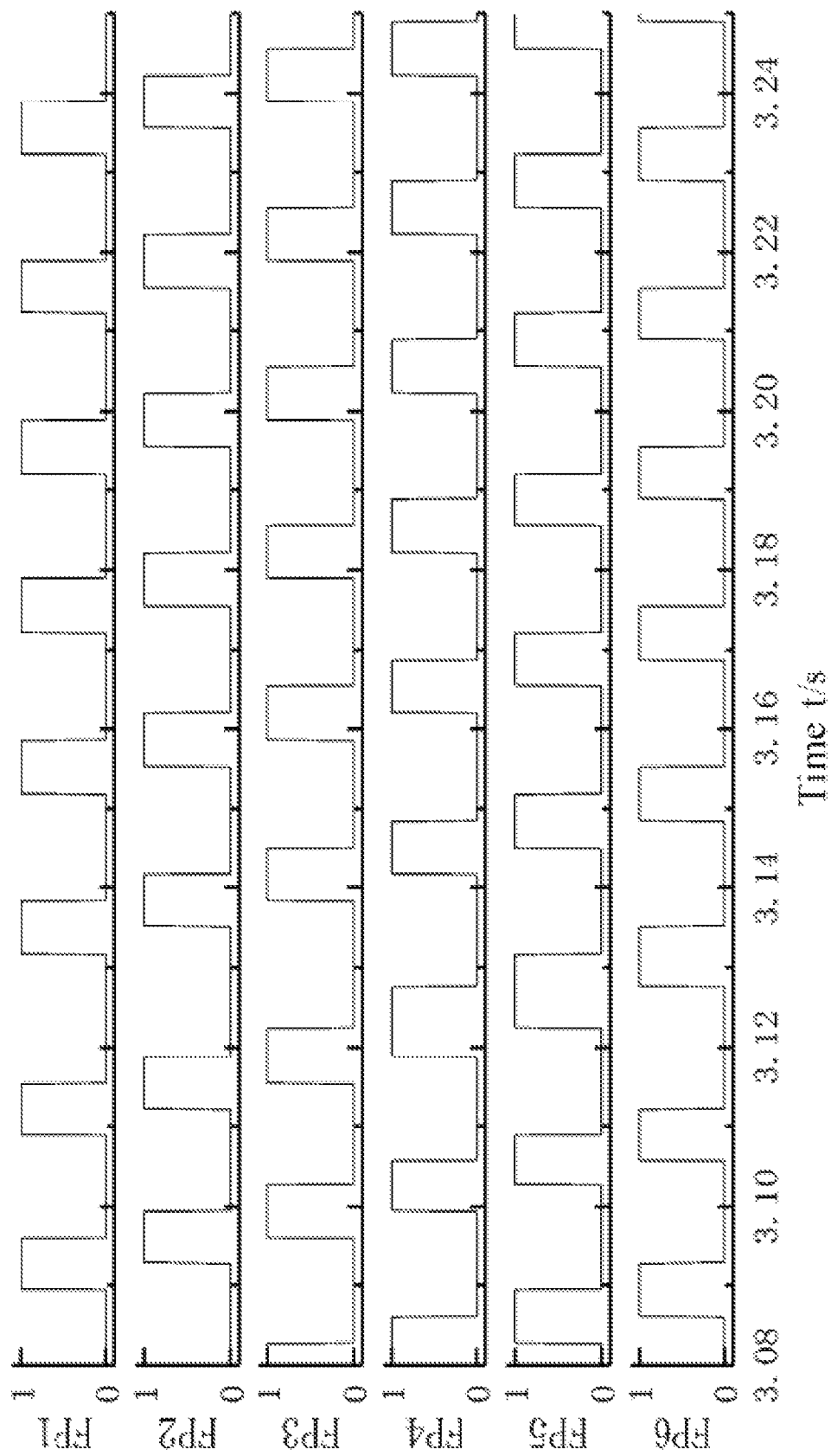
FIG. 5 are trigger pulses of six converter valves of a HVDC power transmission of the present invention, $FP_1$, $FP_2$, $FP_3$, $FP_4$, $FP_5$, $FP_6$ are the trigger pulses of the six converter valves.

S1. first, the converter involved in the present invention is briefly described. The commutation topology of this embodiment is shown in FIG. 3. In the figure, six valve arms are numbered in the order in which they are normally opened. VT1 represents the converter valve numbered 1, VT2 represents the converter valve numbered 2, VT3 represents the converter valve numbered 3, VT4 represents the converter valve numbered 4, VT5 represents the converter valve numbered 5, VT6 represents the converter valve numbered 6. Valve VT4, valve VT6, valve VT2 form an upper bridge arm. Valve VT1, valve VT3, valve VT5 form a lower bridge arm. Collecting three-phase AC currents $i_a$, $i_b$, $i_c$ and DC currents $i_{dH}$, idN on a valve side of a converter of FIG. 3 of a DC transmission system, and trigger pulses $FP_1$, $FP_2$, $FP_3$, $FP_4$, $FP_5$, $FP_6$ of converter valves. According to the collected signals, the current waveforms of the three-phase AC currents and DC currents on the valve side before and after the fault are obtained as shown in FIG. 4. The trigger pulse waveforms of the six converter valves are shown in FIG. 5;

S2. according to a topology structure of the converter of the DC transmission system in step S1, according to Kirchhoff's law, establishing a node current equation Ai=y of the three-phase AC currents $i_a$, $i_b$, $i_c$, DC currents $i_{dH}$, $i_{dN}$ and valve currents $i_{VTm}$ on the valve side;

$$\begin{cases} i_{VT2} + i_{VT4} + i_{VT6} = i_{dH} \\ i_{VT1} + i_{VT3} + i_{VT5} = i_{dN} \\ i_{VT4} - i_{VT1} = i_a \\ i_{VT6} - i_{VT3} = i_b \\ i_{VT2} - i_{VT5} = i_c \end{cases} \quad (1)$$

$$\text{wherein } A = \begin{bmatrix} 0 & 1 & 0 & 1 & 0 & 1 \\ 1 & 0 & 1 & 0 & 1 & 0 \\ -1 & 0 & 0 & 1 & 0 & 0 \\ 0 & 0 & -1 & 0 & 0 & 1 \\ 0 & 1 & 0 & 0 & -1 & 0 \end{bmatrix}, i = \begin{bmatrix} i_{VT1} \\ i_{VT2} \\ i_{VT3} \\ i_{VT4} \\ i_{VT5} \\ i_{VT6} \end{bmatrix}, y = \begin{bmatrix} i_{dH} \\ i_{dN} \\ i_a \\ i_b \\ i_c \end{bmatrix},$$

Figure 6:
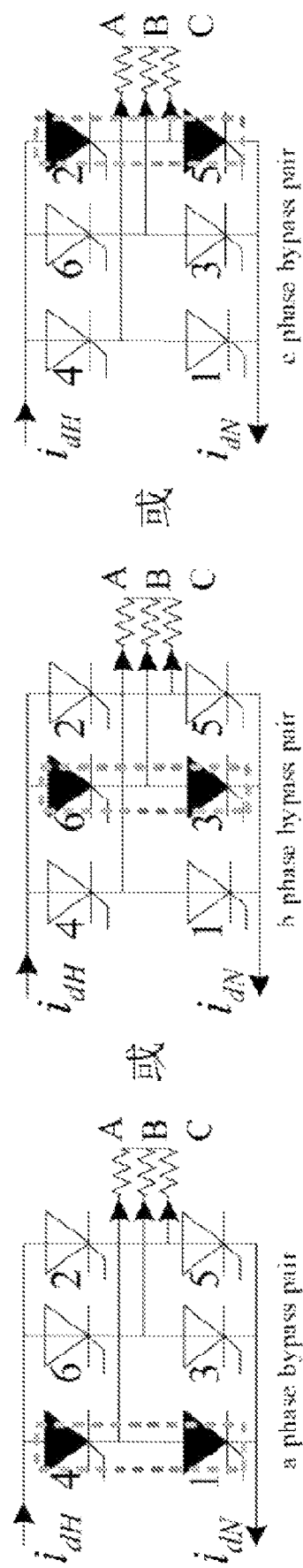
FIG. 6 is a current loop diagram of a state judgment of bypass pair of the converter valve of the present invention.
Figure 7:
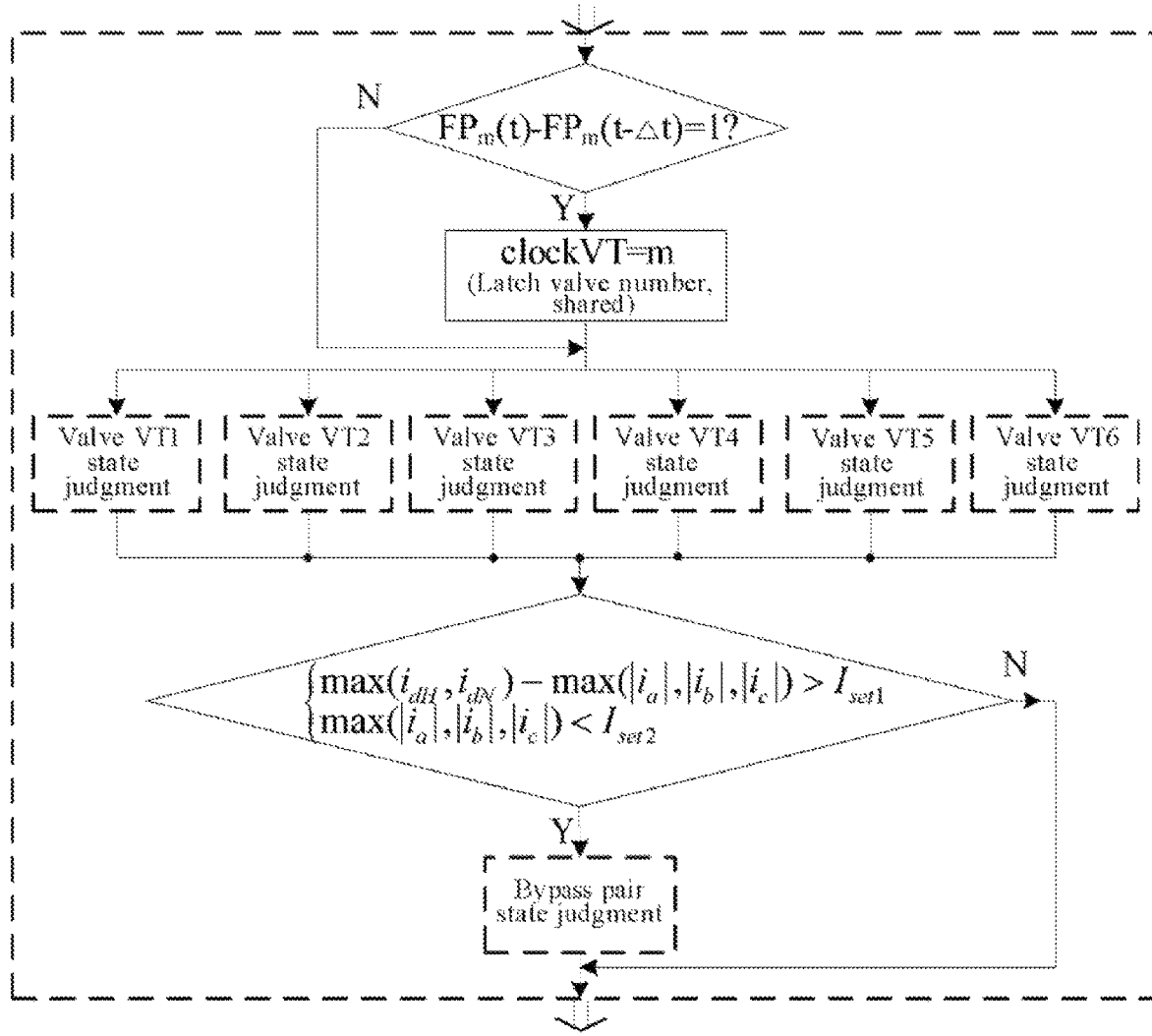
FIG. 7 is a flow chart of a valve state judgment of six pulses of the present invention.
Figure 8:
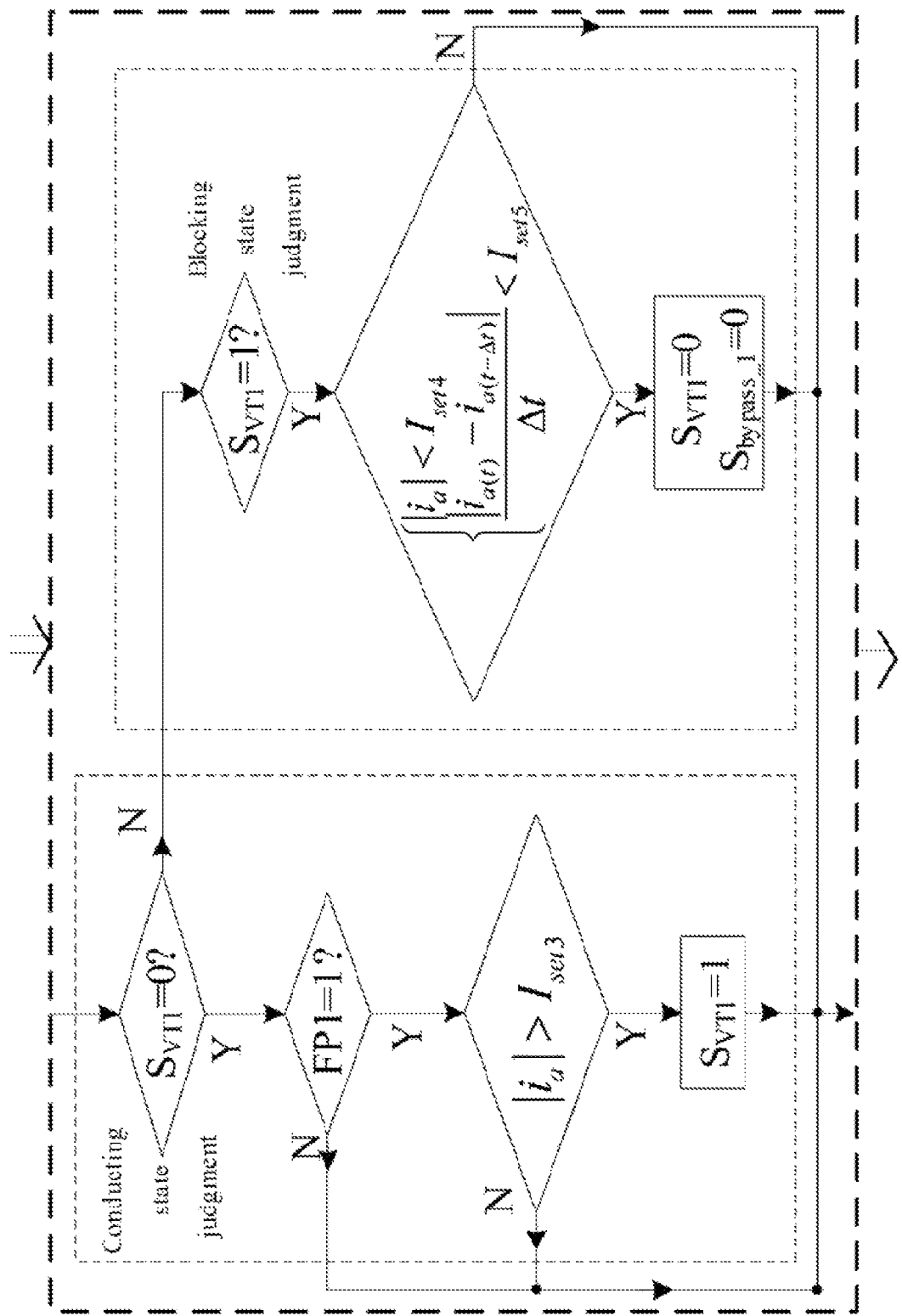
FIG. 8 is a valve state judging flow chart of the converter valve numbered 1 of the present invention.
Figure 9:
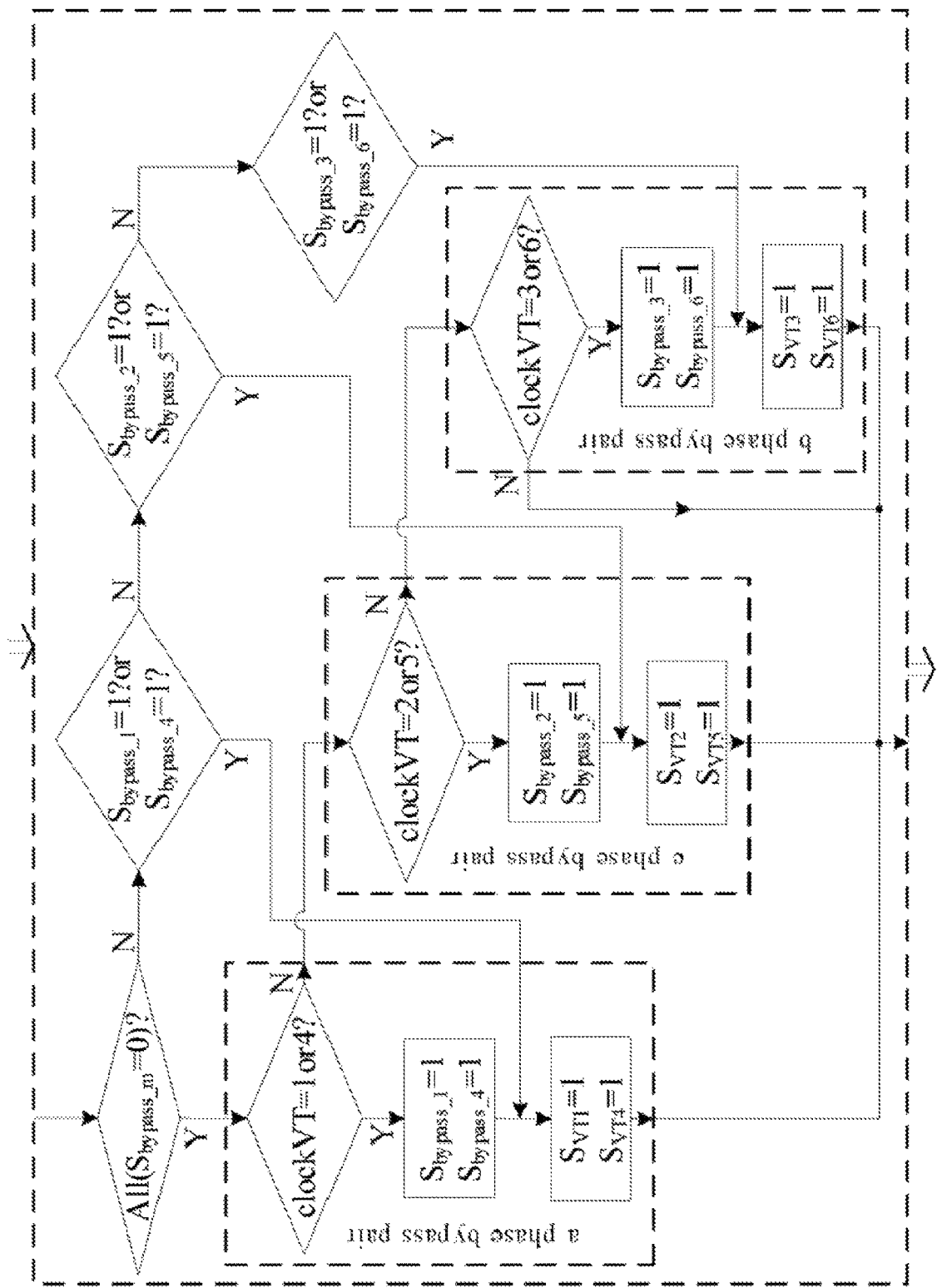
FIG. 9 is a bypass pair state judging flow chart of the present invention.
Figure 10:
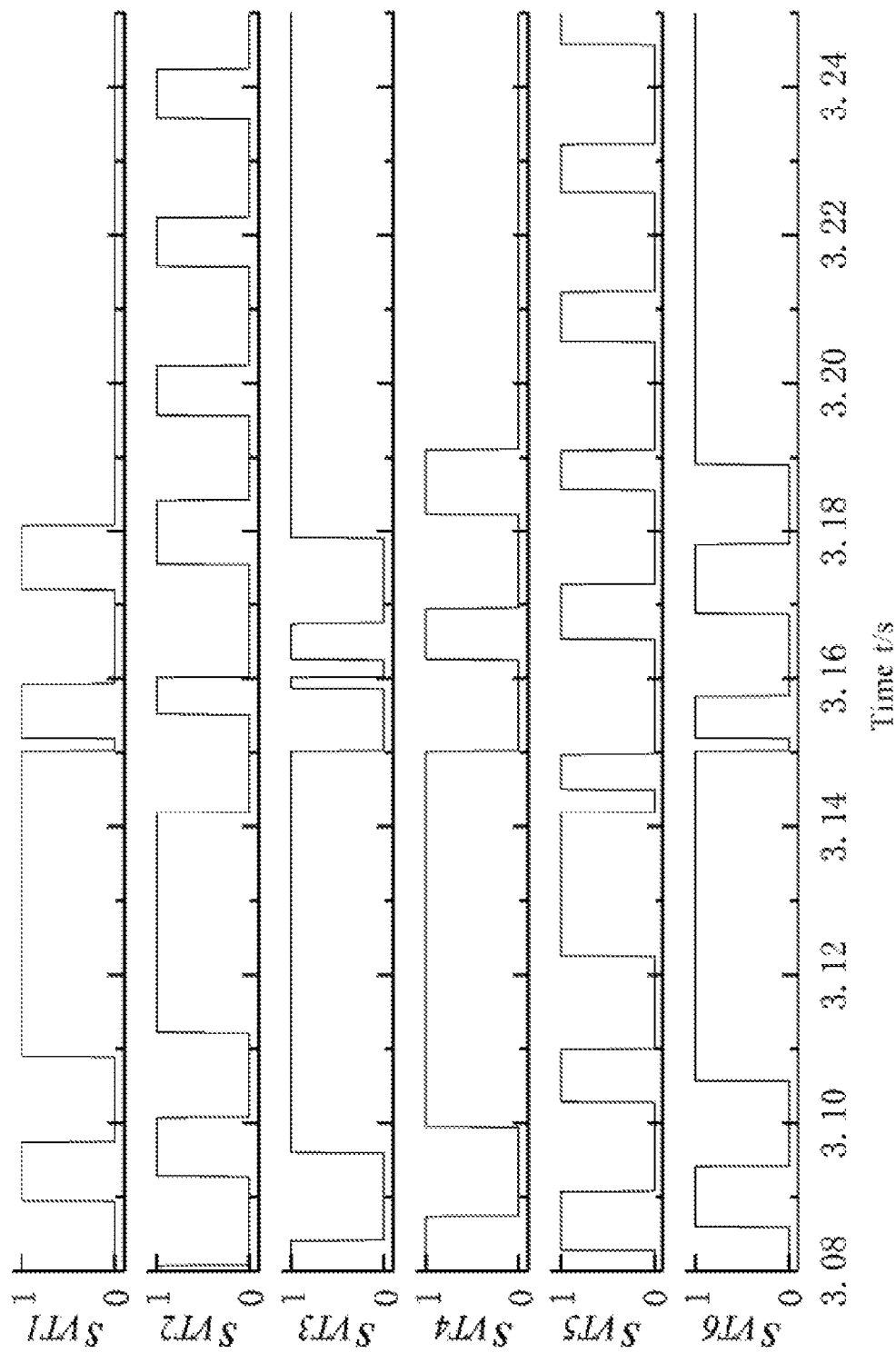
FIG. 10 is a valve state waveform diagram based on the variation characteristics of the AC current of the present invention, in the figure, $S_{VT1}$, $S_{VT2}$, $S_{VT3}$, $S_{VT4}$, $S_{VT5}$, $S_{VT6}$ are valve state signals.

A is a valve current coefficient matrix, i is a valve current vector, y is a current vector at both ends of the valve side, $i_{VTm}$ are respective six converter valve currents, m is a number of six converter valves, m=1, 2, 3, 4, 5, 6;

S3. according to the trigger pulses $FP_1$, $FP_2$, $FP_3$, $FP_4$, $FP_5$, $FP_6$ of the converter valves collected in step S1, when a rising edge of a trigger pulse of a converter valve is detected $FP_m(t)-FP_m(t-\Delta t)=1$, latching the number m of the converter valve into the register; wherein $FP_m(t)$ is a trigger pulse signal of the converter valve numbered m at time t, $FP_m(t-\Delta t)$ is a trigger pulse signal of the converter valve numbered m at time $(t-\Delta t)$, t is a time at a certain moment, $\Delta t$ is a sampling time interval;

For example: when the rising edge of the trigger pulse of the converter valve numbered 1 is detected, the number 1 is stored in the register;

S4. combining steps S1 and S3, according to trigger pulses of the converter valves, the amplitude characteristics of the AC currents and the variation characteristics of the AC currents, performing a conducting state and a blocking state judgment of valve states, obtaining the valve states $s_{VT1}$, $s_{VT2}$, $s_{VT3}$, $s_{VT4}$, $s_{VT5}$, $S_{VT6}$. The valve state judgment of this method mainly uses the amplitude characteristics of the AC current. However, when the converter valves only have same-phase upper and lower arms conducting to form a single-phase bypass pair, as shown in FIG. 6, at this time, the three-phase AC current is 0, the AC and DC currents are completely isolated, and the AC currents cannot be used to judge the valve state. Therefore, it is necessary to judge the valve state of the single-phase bypass pair separately, wherein the flow chart of the complete valve state judgment is shown in FIG. 7. The figure includes a sub-module for judging the valve states of the six converter valves and a sub-module for judging the state of the single-phase bypass pair. The flow chart of the sub-module for judging the valve state of the six converter valves, taking valve VT1 as an example, is shown in FIG. 8. The sub-module for judging the state of the single-phase bypass pair is shown in FIG. 9. According to the flow charts of FIGS. 7, 8, and 9, the waveforms of the six valve states obtained based on the variation characteristics of the AC current are shown in FIG. 10. $s_{VT1}$, $s_{VT2}$, $s_{VT3}$, $s_{VT4}$, $s_{VT5}$, $S_{VT6}$ represent the valve states of the six converter valves respectively;

In this embodiment, with reference to the flow chart of the valve state judgment in FIG. 7, step S4 specifically comprises the following steps:

S41. according to step S1, taking the valve VT1 as an example, the valve state judgment flow chart of the valve VT1 is shown in FIG. 8. When it is detected that the trigger pulse of the VT1 converter valve is at a high electric level and a conducting state criterion of the converter valve is satisfied, setting the valve state $s_{VT1}=1$. Wherein the conducting state criterion of the converter valve is: the amplitude $|i_a|$ of the AC current of the phase a where the valve VT1 is located is greater than the AC current fixed value. That is:

$$|i_k| > I_{set3} \quad (2)$$

in the formula: $i_a$ is the a phase AC current; $I_{set3}$ is an AC current fixed value.

S42. according to step S41, when the valve VT1 is in the conducting state ($s_{VT1}=1$), if the AC current satisfies the blocking state criterion, then the valve VT1 is in the blocking state ($s_{VT1}=0$). Otherwise, valve VT1 continues to remain in the conducting state ($s_{VT1}=1$). Wherein the blocking state criterion of the converter valve is: the amplitude $|i_a|$ of the AC current of phase a where the valve VT1 is located is less than a blocking state current threshold fixed value, and the variation rate of the AC current is less than a variation threshold fixed value. That is:

$$|i_k| < I_{set4} \text{ and } \frac{|i_{k(t)} - i_{k(t-\Delta t)}|}{\Delta t} < I_{set5} \quad (3)$$

in the formula: $I_{set4}$ is the blocking state current threshold fixed value, $I_{set5}$ is the variation threshold fixed value;

S43. according to step S1, step S41 and step S42, when only an upper valve and a lower valve of a single-phase are conducting, the converter valves operate as a single-phase bypass pair, and the two valves of the bypass pair are judged to be in the conducting state. A maximum value of the DC currents minus a maximum value of absolute values of the AC currents is greater than a commutation failure threshold fixed value, and the maximum value of the absolute values of the AC currents is less than a single-phase bypass pair threshold fixed value. That is:

$$\begin{cases} \max(i_{dH}, i_{dN}) - \max(|i_a|, |i_b|, |i_c|) > I_{set1} \\ \max(|i_a|, |i_b|, |i_c|) < I_{set2} \end{cases}, \quad (4)$$

in the formula: $I_{set1}$ is the commutation failure threshold fixed value, $I_{set2}$ is the single-phase bypass pair threshold fixed value.

Figure 11:
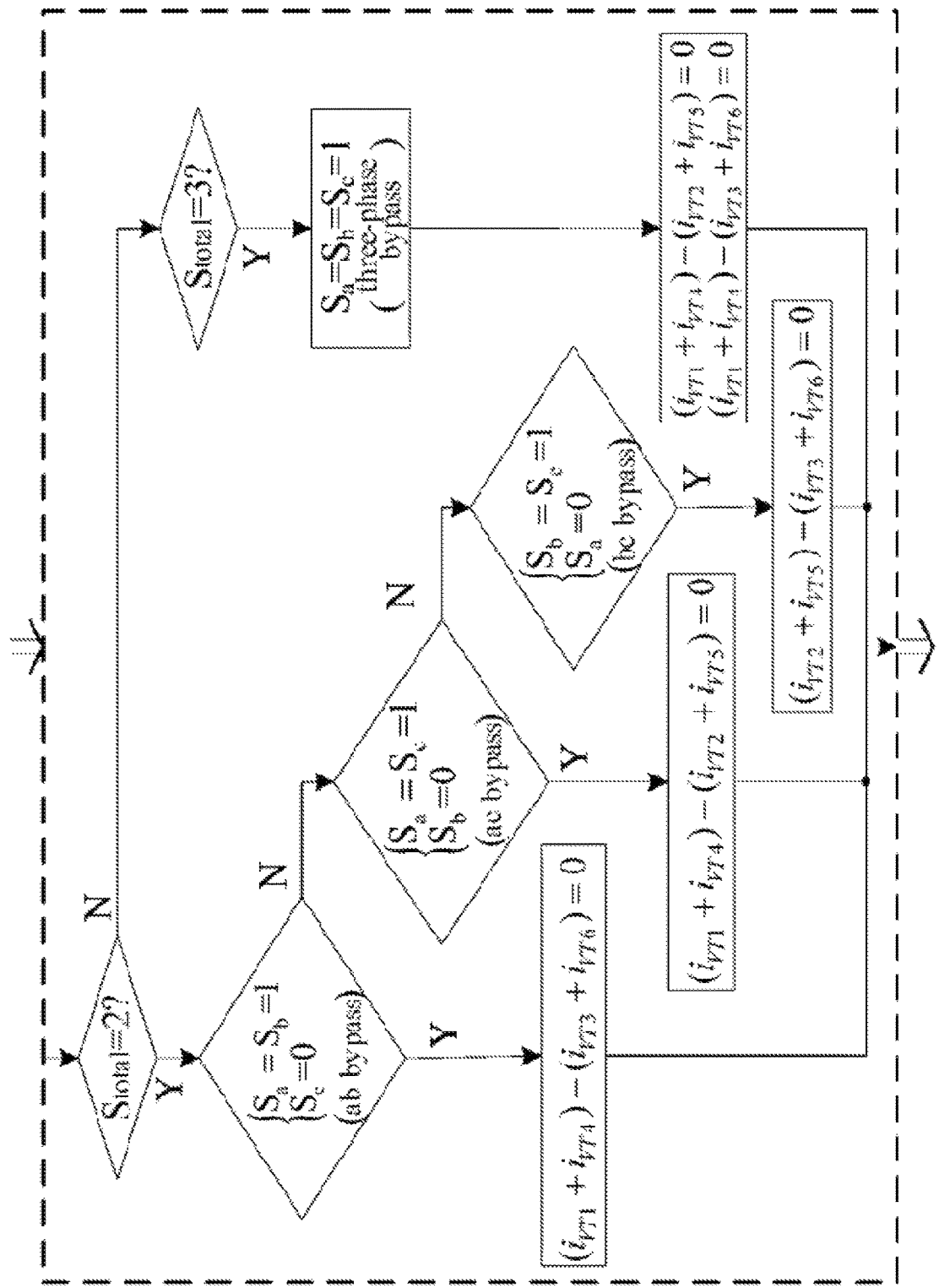
FIG. 11 is a flow chart of supplementing bypass equation of the present invention.

S44. according to S1, step S3 and step S43, when the AC and DC currents satisfy the formula (4) of step S43, the converter valve operates as a single-phase bypass pair and the flow chart of state judgment under the bypass pair condition is shown in FIG. 9. The valve state of the single-phase bypass pair is judged as:
1) When the bypass state flags of all valves are $s_{bypass\_m}=0$, if the register signal in step S3 is equal to 1 or 4, phase a bypasses. Then the bypass state flags $s_{bypass\_1}=1$ and $s_{bypass\_4}=1$, the valve state $s_{VT1}=1$ and $s_{VT4}=1$;
Otherwise: if the register signal in step S3 is equal to 3 or 6, phase b bypasses. Then $s_{bypass\_3}=1$ and $s_{bypass\_6}=1$, $s_{VT3}=1$ and $s_{VT6}=1$;
Otherwise: if the register signal in step S3 is equal to 3 or 6, phase c bypasses. Then $s_{bypass\_2}=1$ and $s_{bypass\_5}=1$, $s_{VT2}=1$ and $s_{VT5}=1$;
2) When the bypass status flag is $s_{bypass\_1}=1$ or $s_{bypass\_4}=1$, maintaining the two valves of phase a continue to be in the conducting state;
Otherwise: when the bypass status flag is $s_{bypass\_3}=1$ or $s_{bypass\_6}=1$, maintaining the two valves of phase b continue to be in the conducting state;
Otherwise: when the bypass status flag is $s_{bypass\_2}=1$ or $s_{bypass\_5}=1$, maintaining the two valves of phase c continue to be in the conducting state;
S5. according to the valve states obtained in step S4, constructing a valve state matrix S:

$$S = \begin{bmatrix} s_{VT1} & & & & & \\ & s_{VT2} & & & & \\ & & s_{VT3} & & & \\ & & & s_{VT4} & & \\ & & & & s_{VT5} & \\ & & & & & s_{VT6} \end{bmatrix} \quad (5)$$

in the formula: $s_{VT1}$, $s_{VT2}$, $s_{VT3}$, $s_{VT4}$, $s_{VT5}$, $S_{VT6}$ are the valve states of the six converter valves;
S6. according to step S5, by calculating a product of an upper valve state and a lower valve state of each phase, judging whether each phase has a bypass state, valve bypass states $S_a$, $S_b$, $S_c$ of each phase are:

$$\begin{cases} S_a = s_{VT1} \times s_{VT4} \\ S_b = s_{VT3} \times s_{VT6} \\ S_c = s_{VT2} \times s_{VT5} \end{cases} \quad (6)$$

in the formula: $S_a$ represents a valve bypass state of phase a, $S_b$ represents a valve bypass state of phase b, $S_c$ represents a valve bypass state of phase c, $S_k=1$ represents a bypass, $S_k=0$ represents no bypass, and k represents three phases of a, b, and c;
S7. according to step S6, summing the valve bypass states of the three phases to judge a number of bypass phases. A number of bypass phases $S_{total}$ is expressed as follows:

$$S_{total}=\Sigma(S_a+S_b+S_c) \quad (7);$$

in the formula: $S_{total}$ represents the number of bypass phases in the three phases abc;
S8. according to the number of bypass phases and the corresponding phases obtained in step S7, when $S_{total}>1$, there are two or more bypass pairs in the converter valves, the valve current cannot be calculated directly according to the node current equation of the converter valves according to formula (1), or the equation solution is not unique, so it is necessary to supplement the bypass loop voltage equation $C_p i=D_p$. The flow chart of the supplementing judgment is shown in FIG. 11, wherein $C_p$ is a coefficient matrix of the bypass loop voltage equation, i is a valve current vector, $D_p$ is a constant vector, and p is serial number of the bypass phases;

In this embodiment, the flow chart of supplementing the bypass loop voltage equation is shown in FIG. 11. Step S8 specifically comprises the following steps:
S81. according to the number of bypass phases obtained in step S7, when the number of bypass phases $S_{total} \leq 1$, there is no need to construct the bypass loop voltage equation, skip to step S91; otherwise, go to step S82;
S82. according to step S7 and step S81, when the number of bypass phases $S_{total}=2$, it indicates that two phase bypass pairs of the converter valves operate, skip to step S92; otherwise, go to step S83.
If: $S_a=S_b$, then a following relationship exists:

$$i_{VT1}+i_{VT4}=i_{VT3}+i_{VT6} \quad (8)$$

supplementing the bypass loop voltage equation $C_{ab}i=D_{ab}$, wherein $C_{ab}=[1\ 0\ -1\ 1\ 0\ -1]$, $D_{ab}=[0]$, $C_{ab}$ is a coefficient matrix of the bypass loop voltage equation when the ab phases bypass, $D_{ab}$ is a constant vector of the bypass loop voltage equation when the ab phases bypass;
when in the bypass condition of $S_a=S_c$ and $S_b=S_c$, it is only needed to modify the corresponding bypass phases in the formula (8).
S83. according to step S7, step S81 and step S82, when the number of bypass phases $S_{total}=3$, it indicates that three phase bypass pairs of the converter valves operate, skip to step S92; at the same time. Then a following relationship exists:

$$\begin{cases} i_{VT1} + i_{VT4} = i_{VT3} + i_{VT6} \\ i_{VT1} + i_{VT4} = i_{VT2} + i_{VT5} \end{cases} \quad (9)$$

in supplementing the bypass loop voltage equation $C_{abc}i=D_{abc}$, $$c_{abc} = \begin{bmatrix} 1 & -1 & 0 & 1 & -1 & 0 \\ 1 & 0 & -1 & 1 & 0 & -1 \end{bmatrix},$$

Figure 1:
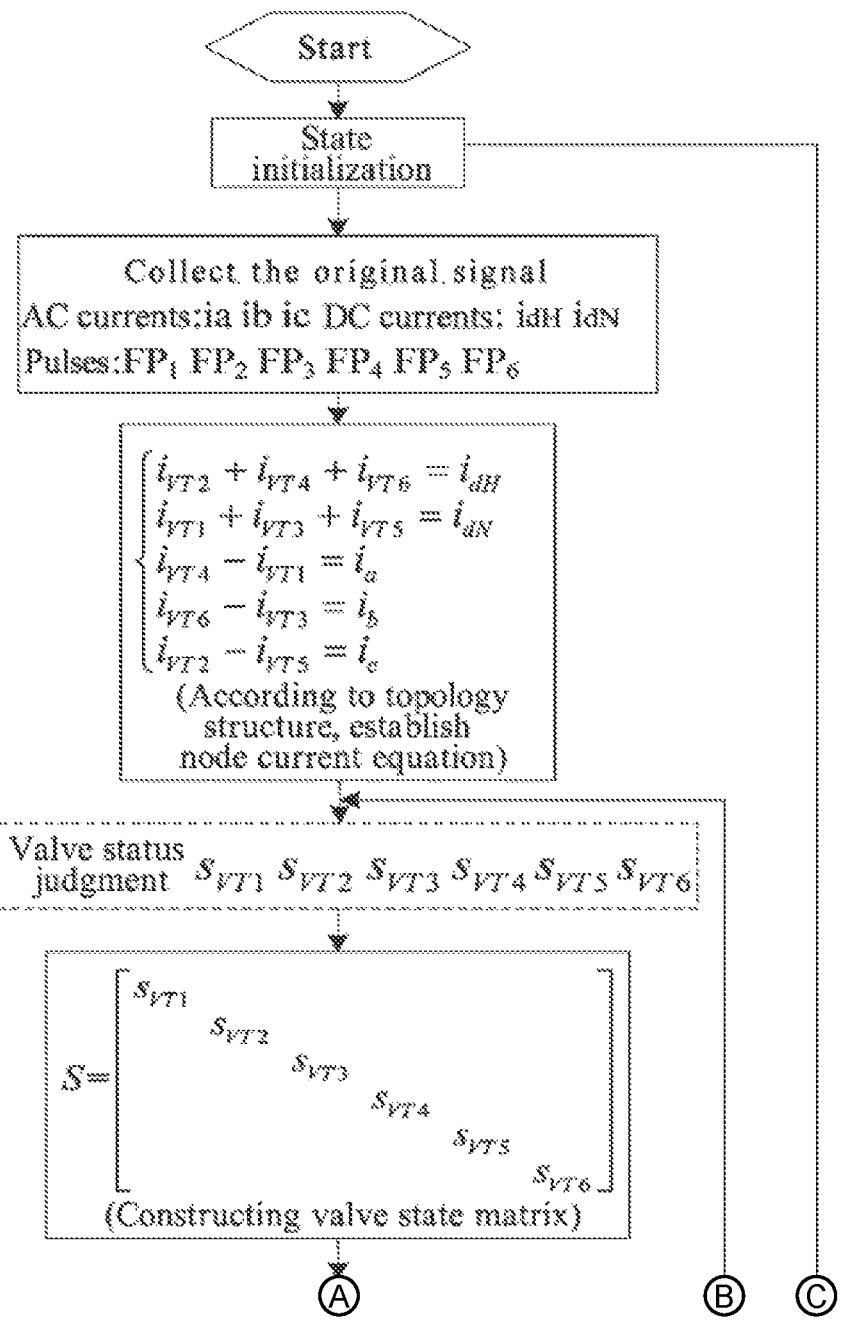
FIG. 1 is a flow chart of a valve state judgment and a valve current calculation of the present invention, clockVT represents a symbol of a register, t_end represents a running end time.
Figure 1:
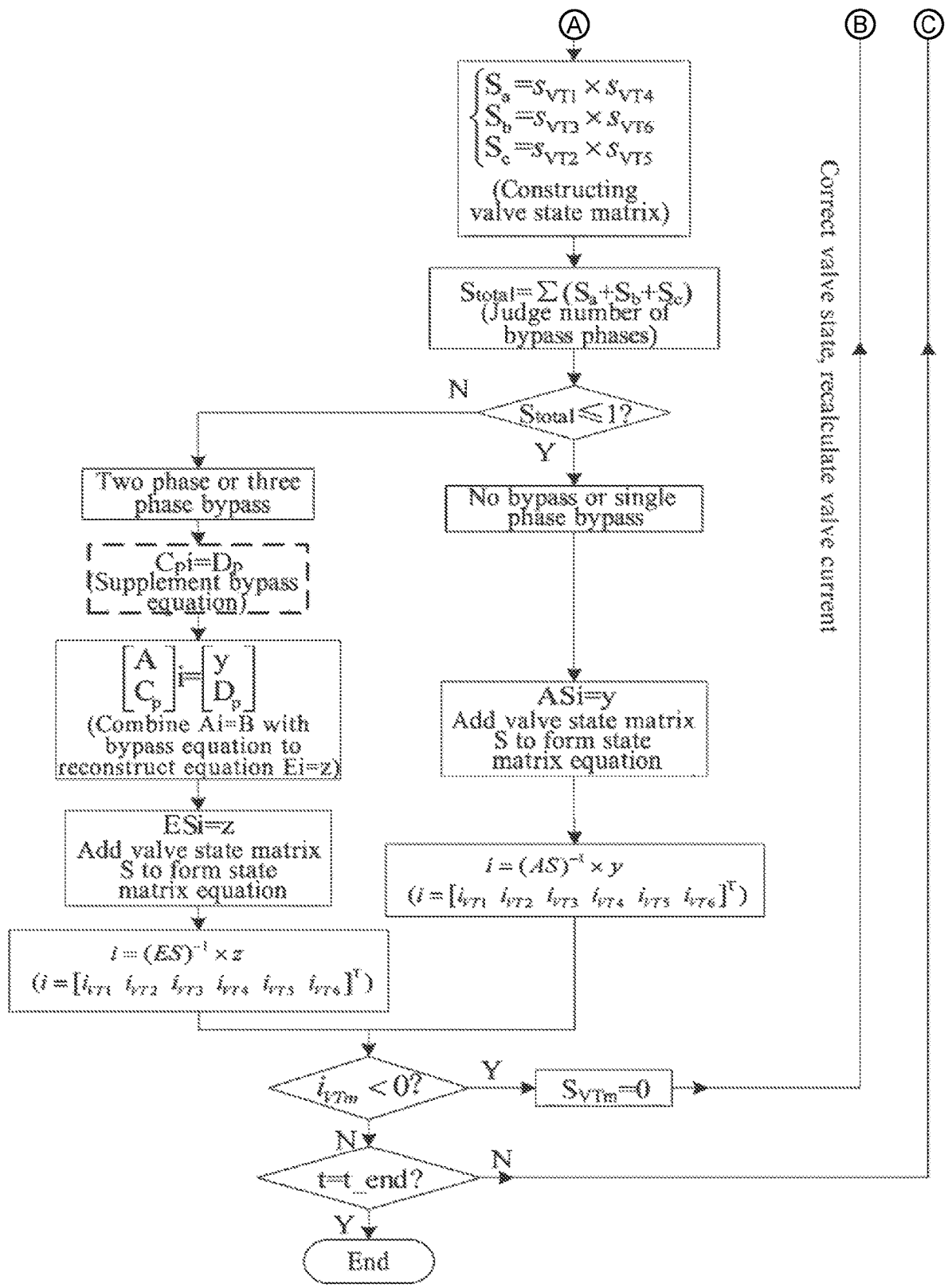
Figure 2:
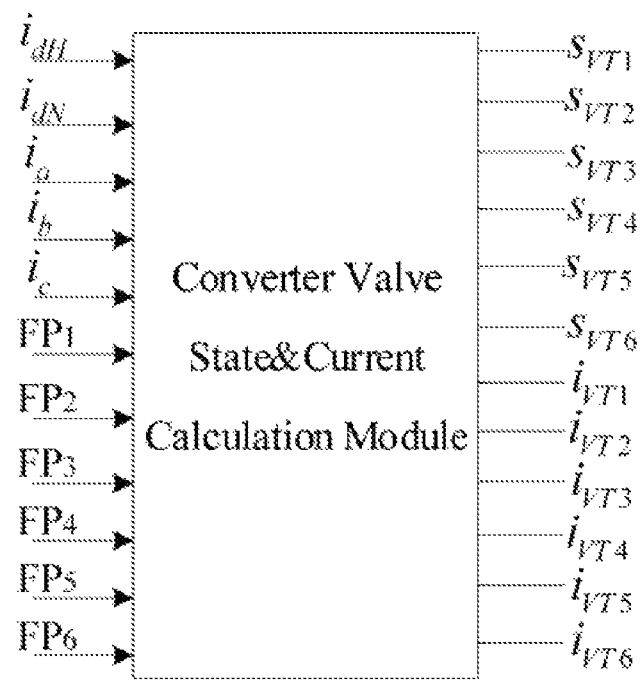
FIG. 2 is an illustrative diagram of a valve state and a valve current calculation model of the present invention, wherein $i_a$, $i_b$, $i_c$, $i_{dH}$, $i_{dN}$ are input ports for collecting current on a valve side of a converter, $FP_1$, $FP_2$, $FP_3$, $FP_4$, $FP_5$, $FP_6$ are collecting input ports for trigger pulses of converter valves, $S_{VT1}$, $S_{VT2}$, $S_{VT3}$, $S_{VT4}$, $S_{VT5}$, $S_{VT6}$ are output ports of valve status signals; $i_{VT1}\ i_{VT2}\ i_{VT3}\ i_{VT4}\ i_{VT5}\ i_{VT6}$ are output ports of valve current calculations.
Figure 12:
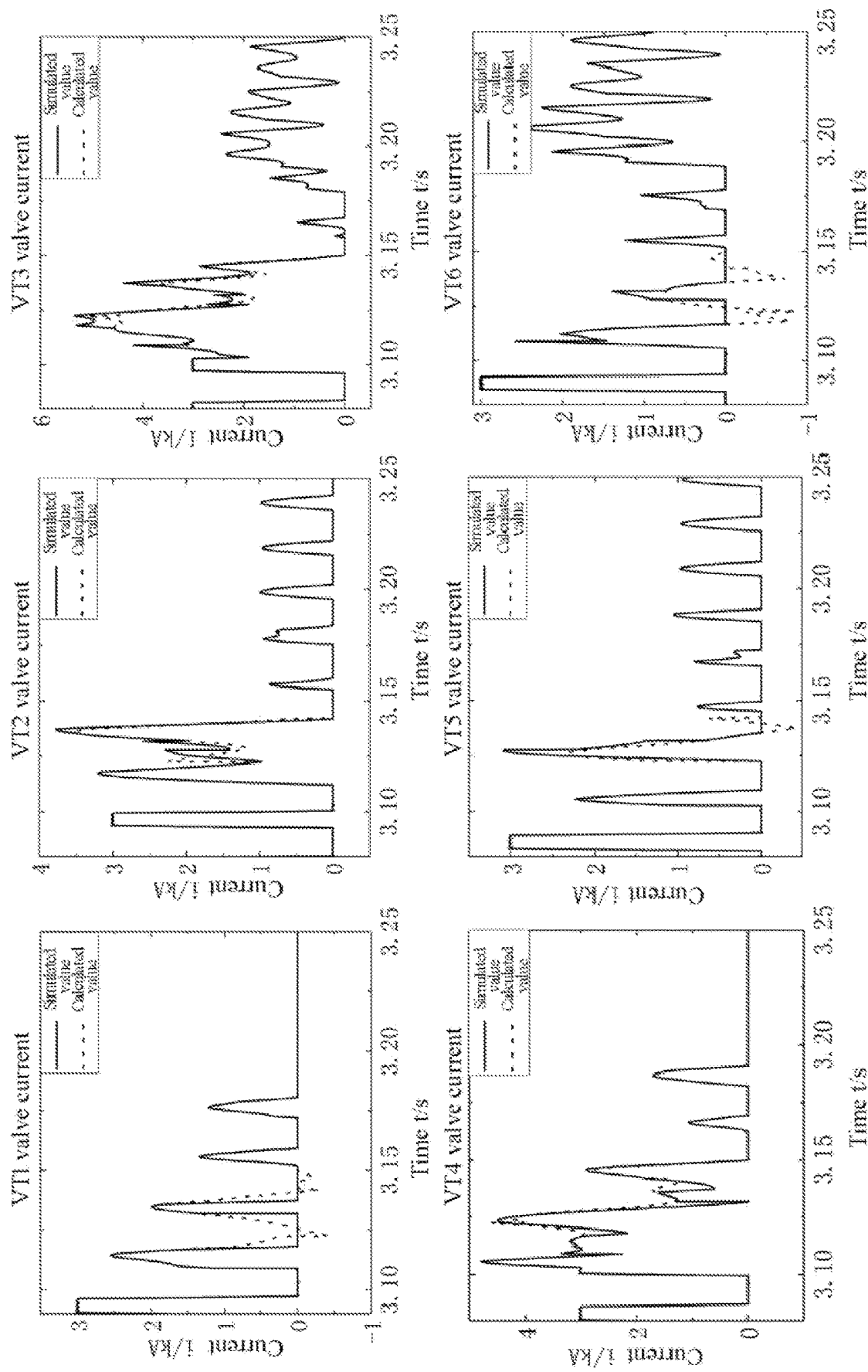
FIG. 12 is a valve current waveform diagram calculated based on valve states of the present invention, in the figure, $i_{VT1}\ i_{VT2}\ i_{VT3}\ i_{VT4}\ i_{VT5}\ i_{VT6}$ are valve current signals.

$D_{abc}=[0\ 0]^T$, $C_{abc}$ is a coefficient matrix of the bypass loop voltage equation when the abc phases bypass, $D_{abc}$ is a constant vector of the bypass loop voltage equation when the abc phases bypass;

S9. according to step S2 and step S8, and in conjunction with step S4, calculating the converter valve currents $i_{VTm}$, obtaining the valve currents $i_{VT1}\ i_{VT2}\ i_{VT3}\ i_{VT4}\ i_{VT5}\ i_{VT6}$ calculated on the basis of the valve state obtained based on the variation characteristics of the AC currents, comparing the calculated valve current with the simulated value in DC project, The waveform is shown in FIG. 12. It is found that there is a significant difference between the calculated value and the simulated value, and there is a situation where the calculated value of the valve current has a negative value, and the calculation result needs to be corrected;

In this embodiment, in conjunction with FIGS. 1 and 11, step S9 specifically comprises the following steps:

S91. according to step S2, step S4 and step S81, constructing a state equation ASi=y based on valve state characteristics, and calculating valve current $i_{VTm}$. Wherein:

$$ASi = \begin{bmatrix} 0 & s_{VT2} & 0 & s_{VT4} & 0 & s_{VT6} \\ s_{VT1} & 0 & s_{VT3} & 0 & s_{VT5} & 0 \\ -s_{VT1} & 0 & 0 & s_{VT4} & 0 & 0 \\ 0 & 0 & -s_{VT3} & 0 & 0 & s_{VT6} \\ 0 & s_{VT2} & 0 & 0 & -s_{VT5} & 0 \end{bmatrix} \begin{bmatrix} i_{VT1} \\ i_{VT2} \\ i_{VT3} \\ i_{VT4} \\ i_{VT5} \\ i_{VT6} \end{bmatrix} = \begin{bmatrix} i_{dH} \\ i_{dN} \\ i_a \\ i_b \\ i_c \end{bmatrix} \quad (10)$$

in the formula, $$AS = \begin{bmatrix} 0 & s_{VT2} & 0 & s_{VT4} & 0 & s_{VT6} \\ s_{VT1} & 0 & s_{VT3} & 0 & s_{VT5} & 0 \\ -s_{VT1} & 0 & 0 & s_{VT4} & 0 & 0 \\ 0 & 0 & -s_{VT3} & 0 & 0 & s_{VT6} \\ 0 & s_{VT2} & 0 & 0 & -s_{VT5} & 0 \end{bmatrix},$$

AS is the coefficient matrix.

inverting the coefficient matrix AS. Calculating valve current $i_{TVm}$:

$$i=(AS)^{-1} \times y \quad (11)$$

in the formula: $i=[i_{VT1}\ i_{VT2}\ i_{VT3}\ i_{VT4}\ i_{VT5}\ i_{VT6}]^T$.

S92. according to step S2, step S4, step S81 and step S83, combining Ai=y and $C_p i=D_p$, combining the valve state characteristics S to construct a state equation ESi=z, inverting its coefficient matrix, and calculating the valve current $i_{Vtm}$.

For example: when $S_a=S_b$, combining equations (1) and (8) to construct the state equation $E_{ab}Si=z_{ab}$:

$$E_{ab}Si = \begin{bmatrix} 0 & s_{VT2} & 0 & s_{VT4} & 0 & s_{VT6} \\ s_{VT1} & 0 & s_{VT3} & 0 & s_{VT5} & 0 \\ -s_{VT1} & 0 & 0 & s_{VT4} & 0 & 0 \\ 0 & 0 & -s_{VT3} & 0 & 0 & s_{VT6} \\ 0 & s_{VT2} & 0 & 0 & -s_{VT5} & 0 \\ s_{VT1} & 0 & -s_{VT3} & s_{VT4} & 0 & -s_{VT6} \end{bmatrix} \begin{bmatrix} i_{VT1} \\ i_{VT2} \\ i_{VT3} \\ i_{VT4} \\ i_{VT5} \\ i_{VT6} \end{bmatrix} = \begin{bmatrix} i_{dH} \\ i_{dN} \\ i_a \\ i_b \\ i_c \\ 0 \end{bmatrix} \quad (12)$$

in the formula, $$E_{ab}S = \begin{bmatrix} 0 & s_{VT2} & 0 & s_{VT4} & 0 & s_{VT6} \\ s_{VT1} & 0 & s_{VT3} & 0 & s_{VT5} & 0 \\ -s_{VT1} & 0 & 0 & s_{VT4} & 0 & 0 \\ 0 & 0 & -s_{VT3} & 0 & 0 & s_{VT6} \\ 0 & s_{VT2} & 0 & 0 & -s_{VT5} & 0 \\ s_{VT1} & -s_{VT2} & 0 & s_{VT4} & -s_{VT5} & 0 \end{bmatrix},$$

$$i = \begin{bmatrix} i_{VT1} \\ i_{VT2} \\ i_{VT3} \\ i_{VT4} \\ i_{VT5} \\ i_{VT6} \end{bmatrix}, z_{ab} = \begin{bmatrix} i_{dH} \\ i_{dN} \\ i_a \\ i_b \\ i_c \\ 0 \end{bmatrix}.$$

Inverting the coefficient matrix $E_{ab}S$ to calculate the valve current $i_{VTm}$:

$$i=(E_{ab}S)^{-1} \times z_{ab} \quad (13)$$

in the formula: $i=[i_{VT1}\ i_{VT2}\ i_{VT3}\ i_{VT4}\ i_{VT5}\ i_{VT6}]^T$, $$E_{ab} = \begin{bmatrix} A \\ C_{ab} \end{bmatrix}, z_{ab} = \begin{bmatrix} y \\ D_{ab} \end{bmatrix},$$

p=ab, $E_{ab}$ is a coefficient matrix formed by the coefficient matrix A and the coefficient matrix $C_{ab}$, $z_{ab}$ is a vector formed by the current vector y and the constant vector $D_{ab}$ at both ends of the valve.

The similar situations occur for other bypass conditions.

Figure 13:
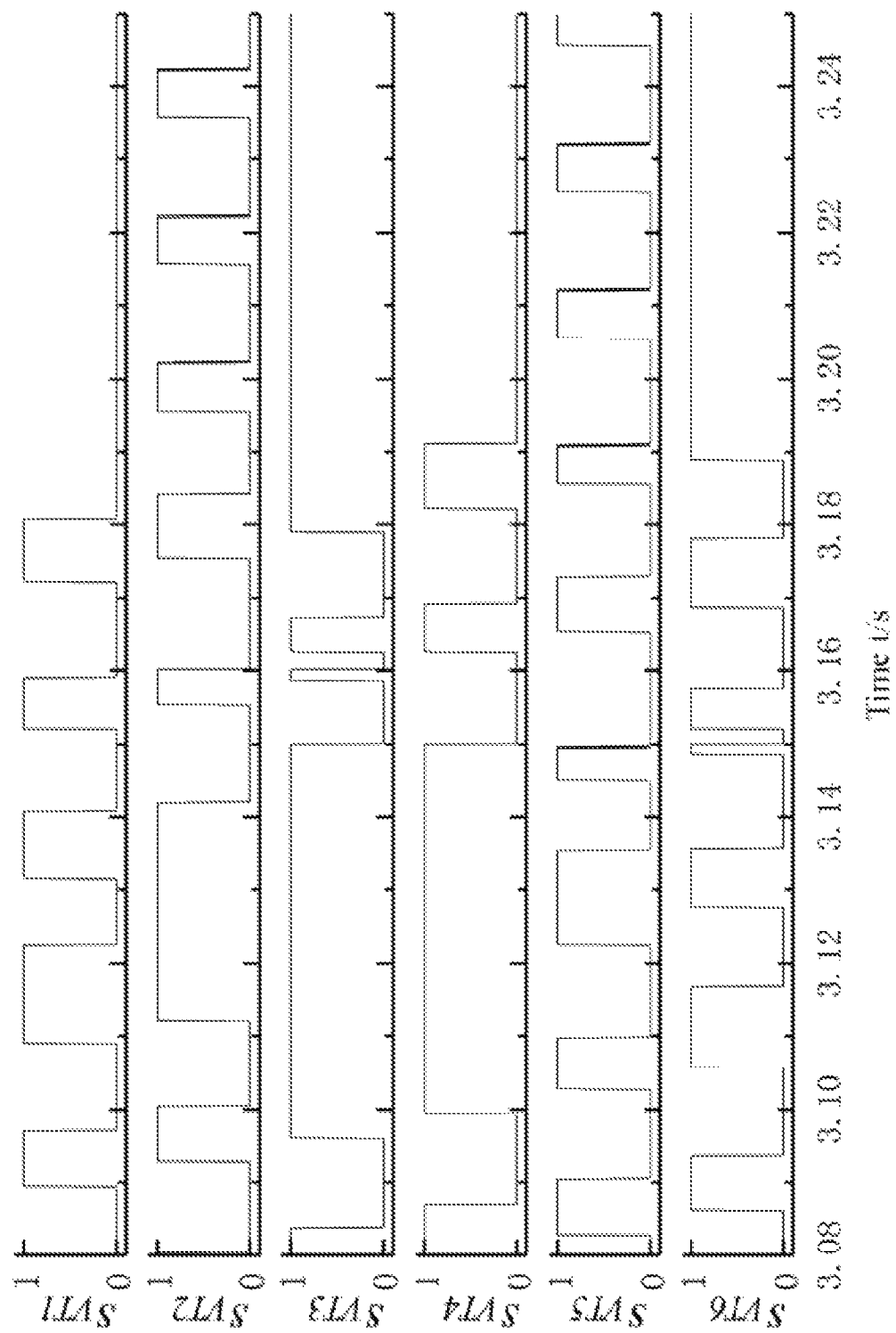
FIG. 13 is a valve state waveform diagram considering a one-way conductivity correction of a valve of the present invention, in the figure, $S_{VT1}$, $S_{VT2}$, $S_{VT3}$, $S_{VT4}$, $S_{VT5}$, $S_{VT6}$ are valve state signals.
Figure 14:
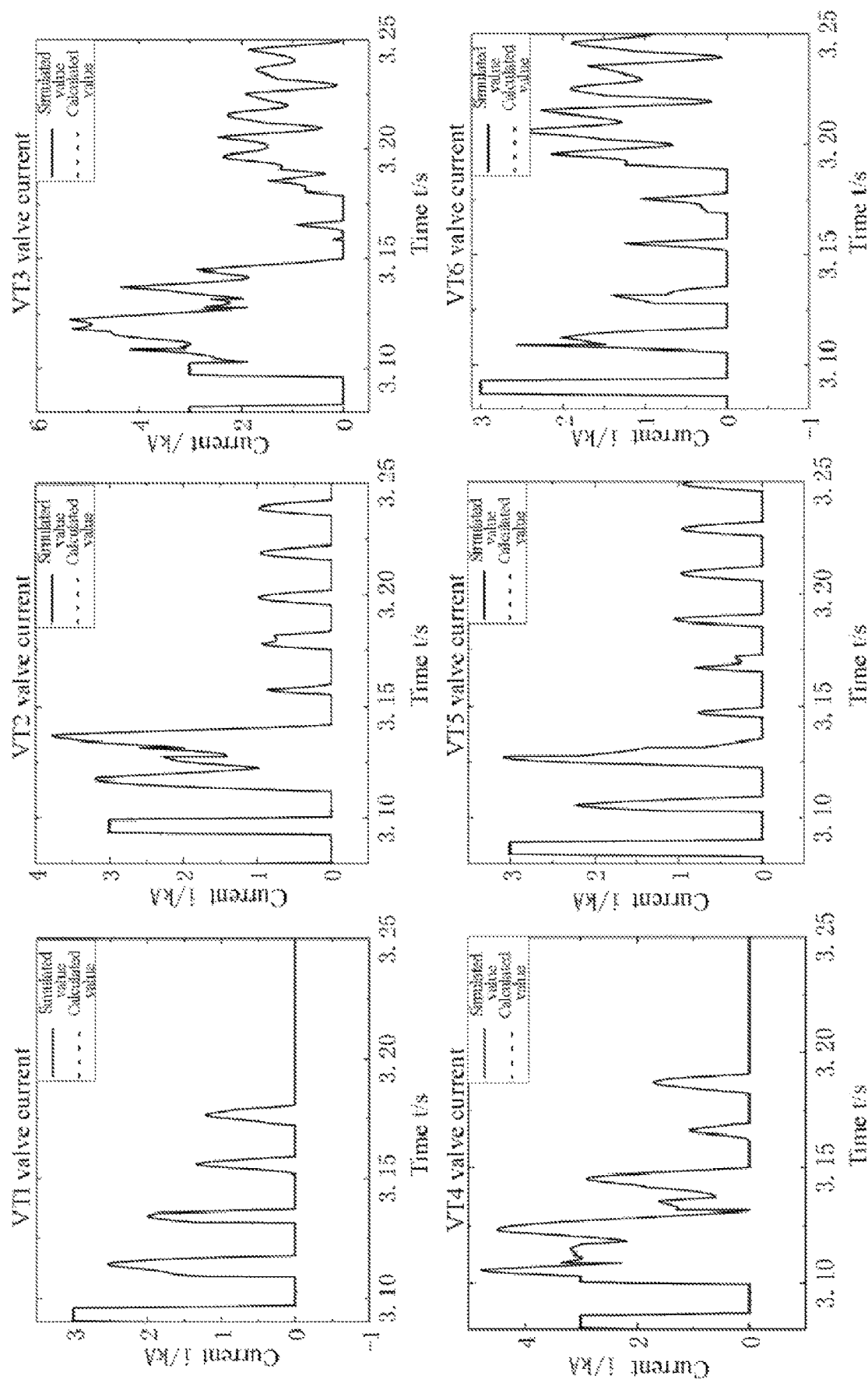
FIG. 14 is a valve current waveform diagram calculated based on corrected valve states of the present invention, in the figure, $i_{VT1}\ i_{VT2}\ i_{VT3}\ i_{VT4}\ i_{VT5}\ i_{VT6}$ are valve current signals.

S10. according to step S9, when the valve currents $i_{VTm}$ (m=1, 2, 3, 4, 5, 6) calculated in step S9<0, considering a one-way conductivity of the converter valves, in a specified positive direction, the current of the converter valves can only be a positive value, correcting the valve states at this time, and correcting the valve state to blocking state $s_{VTm}=0$, otherwise, do not correct;

S11. repeating steps S5 to S10 until the valve currents $i_{VTm} \geq 0$ is calculated. The corrected valve state considering the unidirectional conductivity of the valve is shown in FIG. 13, $s_{VT1}$, $s_{VT2}$, $s_{VT3}$, $s_{VT4}$, $s_{VT5}$, $S_{VT6}$ are the corrected valve states of the six converter valves; recalculating the valve currents $i_{VT1}$, $i_{VT2}$, $i_{VT3}$, $i_{VT4}$, $i_{VT5}$, $i_{VT6}$ based on the corrected valve states, comparing the calculated valve currents with the simulated values after the valve states are corrected, and the waveform is shown in FIG. 14. It is found that the calculated values are consistent with the simulated values, indicating the effectiveness of this method.

To sum up, a calculation method for a converter valve state and a valve current based on temporal features of a valve side current proposed in this embodiment uses trigger pulse signals of the converter valves and the variation characteristics of the AC current amplitude to judge the valve states; based on the valve states, the valve currents are calculated by combining a topological relationship between the AC and DC currents and the valve currents. Considering the one-way conductivity of the valves to correct the valve states, and the valve currents are recalculated so as to obtain the valve states and valve currents of the entire operation process. According to FIG. 14, the calculated value of the valve currents are consistent with the simulated values in actual DC power grid, which verifies the effectiveness of the method of the present invention. This method may be applied to practical project, and is very important for project fault analysis and control coordination.

The above-mentioned embodiments are preferred embodiments of the present invention, but the embodiments of the present invention are not limited by the above-mentioned embodiments, and any other changes, modifications, substitutions, combinations, simplifications should be equivalent replacement manners, which are all included in the protection scope of the present invention.

The invention claimed is:

1. A method for determining a converter valve state and a valve current based on temporal features of a valve side current, for use in fault analysis and control and protection optimization of DC project, characterized in that, the calculation method comprises following steps:

S1. collecting three-phase AC currents $i_a$, $i_b$, $i_c$, and DC currents $i_{dH}$, $i_{dN}$ on a converter valve side of a DC transmission system, and trigger pulses $FP_1$, $FP_2$, $FP_3$, $FP_4$, $FP_5$, $FP_6$ of converter valves;

S2. according to a topology structure of the converter of the DC transmission system, establishing a node current equation $Ai=y$ of the three-phase AC currents $i_a$, $i_b$, $i_c$, the DC currents $i_{dH}$, $i_{dN}$ and valve currents $i_{VTm}$ on the valve side;

$$\begin{cases} i_{VT2} + i_{VT4} + i_{VT6} = i_{dH} \\ i_{VT1} + i_{VT3} + i_{VT5} = i_{dN} \\ i_{VT4} - i_{VT1} = i_a \\ i_{VT6} - i_{VT3} = i_b \\ i_{VT2} - i_{VT5} = i_c \end{cases} \quad (G1)$$

wherein $A = \begin{bmatrix} 0 & 1 & 0 & 1 & 0 & 1 \\ 1 & 0 & 1 & 0 & 1 & 0 \\ -1 & 0 & 0 & 1 & 0 & 0 \\ 0 & 0 & -1 & 0 & 0 & 1 \\ 0 & 1 & 0 & 0 & -1 & 0 \end{bmatrix}$, $i = \begin{bmatrix} i_{VT1} \\ i_{VT2} \\ i_{VT3} \\ i_{VT4} \\ i_{VT5} \\ i_{VT6} \end{bmatrix}$, $y = \begin{bmatrix} i_{dH} \\ i_{dN} \\ i_a \\ i_b \\ i_c \end{bmatrix}$, is a valve current coefficient matrix, i is a valve current vector, y is a current vector at both ends of the valve side, $i_{VTm}$ are respective six converter valve currents, m is a number of six converter valves, m=1, 2, 3, 4, 5, 6;

S3. according to the trigger pulses $FP_1$, $FP_2$, $FP_3$, $FP_4$, $FP_5$, $FP_6$ of the converter valves obtained in step S1, when detecting a rising edge of a trigger pulse of a converter valve, latching the number m of the converter valve into a register;

S4. according to the trigger pulses $FP_1$, $FP_2$, $FP_2$, $FP_4$, $FP_5$, $FP_6$ of the converter valves obtained in step S1, and amplitude characteristics of the AC currents and characteristics of AC variations, to perform a conducting state and a blocking state judgment of valve states, and obtaining six valve states of the converter valves $S_{VT1}$, $S_{VT2}$, $S_{VT3}$, $S_{VT4}$, $S_{VT5}$, $S_{VT6}$;

S5. according to the valve states obtained in step S4, constructing a valve state matrix S:

$$S = \begin{bmatrix} s_{VT1} & & & & & \\ & s_{VT2} & & & & \\ & & s_{VT3} & & & \\ & & & s_{VT4} & & \\ & & & & s_{VT5} & \\ & & & & & s_{VT6} \end{bmatrix}; \quad (G2)$$

in the formula (G2): $S_{VT1}$, $S_{VT2}$, $S_{VT3}$, $S_{VT4}$, $S_{VT5}$, $S_{VT6}$ are the valve states of the six converter valves;

S6. by calculating a product of an upper valve state and a lower valve state of each phase, judging whether each phase has a bypass state, valve bypass states $S_a$, $S_b$, $S_c$ of each phase are:

$$\begin{cases} S_a = s_{VT1} \times s_{VT4} \\ S_b = s_{VT3} \times s_{VT6} \\ S_c = s_{VT2} \times s_{VT5} \end{cases} \quad (G3)$$

in the formula (G3): $S_a$ represents a valve bypass state of phase a, $S_b$ represents a valve bypass state of phase b, $S_c$ represents a valve bypass state of phase c, $S_k=1$ represents a bypass, $S_k=0$ represents no bypass, and k is serial numbers of a, b, and c phases;

S7. summing the valve bypass states of the three phases to judge a number of bypass phases, where a number of bypass phases $S_{total}$ is expressed as follows:

$$S_{total}=\Sigma(S_a+S_b+S_c) \quad (G4);$$

in the formula (G4): $S_{total}$ represents the number of bypass phases in the three phases abc;

S8. according to the number of bypass phases and corresponding phases obtained in step S7, supplementing a bypass loop voltage equation $C_p i = D_p$; wherein $C_p$ is a coefficient matrix of the bypass loop voltage equation, i is a valve current vector, $D_p$ is a constant vector, and p is serial number of the bypass phases;

S9. according to step S2 and step S8, and in conjunction with step S4, calculating the valve currents $i_{VTm}$;

S10. when the valve currents $i_{VTm}$ calculated in step S9<0, considering a one-way conductivity of the converter valves, correcting the valve states, correcting the valve states to blocking state $S_{VTm}=0$, otherwise, do not correct;

S11. repeating steps S5 to S10 until the valve currents $i_{VTm} \geq 0$ is calculated; and S12. coordinating control of the converter valves, based on the corrected valve states and the calculated valve currents.

2. The calculation method for a converter valve state and a valve current based on temporal features of a valve side current according to claim 1, characterized in that, processes of step S4 are as follows:

S41. when it is detected in step S1 that the trigger pulses of the converter valves are at a high electric level and a conducting state criterion of the converter valves is satisfied, setting the valve states $S_{VTm}=1$, wherein the conducting state criterion of the converter valves is: an amplitude $|i_k|$ of an AC current of the phase where the converter valve numbered m is located is greater than an AC current fixed value, namely:

$$|i| > I_{set3} \quad (G5)$$

in the formula (G5): $i_k$ is a, b, c three-phase AC currents, $I_{set3}$ is the AC current fixed value;

S42. when the converter valve numbered m is in a conducting state $S_{VTm}=1$, if the AC current meets a blocking state criterion, then the converter valve numbered m is in a blocking state $S_{VTm}=0$; otherwise, the converter valve numbered m continues to maintain the conducting state $S_{VTm}=1$, wherein the blocking state criterion of the converter valve is: the amplitude $|i_k|$ of the AC current of the phase where the converter valve numbered m is located is less than a blocking state current threshold fixed value, and a variation rate of the AC current is less than a variation threshold fixed value, namely:

$$|i_k| < I_{set4} \text{ and } \frac{|i_{k(t)} - i_{k(t-\Delta t)}|}{\Delta t} < I_{set5} \quad (G6)$$

in the formula (G6): $I_{set4}$ is the blocking state current threshold fixed value, $I_{set5}$ is the variation threshold fixed value;

S43. when only an upper valve and a lower valve of a single-phase are conducting, the converter valves operate as a single-phase bypass pair, and the two valves of the bypass pair are judged to be in the conducting state, a single-phase bypass pair judgment condition is: a maximum value of the DC currents minus a maximum value of absolute values of the AC currents is greater than a commutation failure threshold fixed value, and the maximum value of the absolute values of the AC currents is less than a single-phase bypass pair threshold fixed value, namely:

$$\begin{cases} \max(i_{dH}, i_{dN}) - \max(|i_a|, |i_b|, |i_c|) > I_{set1} \\ \max(|i_a|, |i_b|, |i_c|) < I_{set2} \end{cases} \quad (G7)$$

in the formula (G7): $I_{set1}$ is the commutation failure threshold fixed value, $I_{set2}$ is the single-phase bypass pair threshold fixed value;

S44. when the AC and DC currents satisfy formula (G7) of step S43, the converter valves operate as a single-phase bypass pair, wherein a valve state judgment condition of the single-phase bypass pair is:

1) When bypass state flags of all valves $S_{bypass\_m}=0$, if a register signal in step S3 is equal to m, a phase where the converter valve numbered m is located is a bypass phase, setting the bypass state flags of the two valves in the bypass phase equal to 1, keeping the two valves of the bypass phase in the conducting state, namely: $S_{bypass\_m}=1$ and $S_{bypass\_(mod(m+3,6))}=1$, $S_{VTm}=1$ and $S_{VT(mod(m+3,6))}=1$;

2) When the bypass status flags of the phase where the converter valve numbered m is located is $S_{bypass\_m}=1$ or $S_{bypass\_(mod(m+3,6))}=1$, keeping the two valves of the phase where the converter valve numbered m is located in the conducting state.

3. The calculation method for a converter valve state and a valve current based on temporal features of a valve side current according to claim 1, characterized in that, processes of step S8 are as follows:

S81. according to the number of bypass phases obtained in step S7, when the number of bypass phases $S_{total} \leq 1$, the converter valves operate without a bypass pair or one phase bypass pair, at this time, there is no need to construct the bypass loop voltage equation, skip to step S91, otherwise, go to step S82;

S82. when the number of bypass phases $S_{total}=2$, it indicates that two phase bypass pairs of the converter valves operate, supplementing the bypass loop voltage equation $C_p i=D_p$, skip to step S92; otherwise, go to step S83; wherein, 1) If $S_a=S_b$, then a following relationship exists:

$$i_{VT1}+i_{VT4}=i_{VT3}+i_{VT6} \quad (G8)$$

supplementing the bypass loop voltage equation $C_{ab}i=D_{ab}$, wherein $C_{ab}=[1\ 0\ -1\ 1\ 0\ -1]$, $D_{ab}=[0]$, p=ab, $C_{ab}$ is a coefficient matrix of the bypass loop voltage equation when the ab phases bypass, $D_{ab}$ is a constant vector of the bypass loop voltage equation when the ab phases bypass;

2) If $S_a=S_c$, then a following relationship exists:

$$i_{VT1}+i_{VT4}=i_{VT2}+i_{VT5} \quad (G9)$$

supplementing the bypass loop voltage equation $C_{ac}i=D_{ac}$, wherein $C_{ac}=[1\ -1\ 0\ 1\ -1\ 0]$, $D_{ac}=[0]$, p=ac, $C_{ac}$ is a coefficient matrix of the bypass loop voltage equation when the ac phase bypass, and $D_{ac}$ is a constant vector of the bypass loop voltage equation when the ac phase bypass;

3) If $S_b=S_c$, then a following relationship exists:

$$i_{VT2}+i_{VT5}=i_{VT3}+i_{VT6} \quad (G10)$$

supplementing the bypass loop voltage equation $C_{bc}i=D_{bc}$, $C_{bc}=[0\ 1\ -1\ 0\ 1\ -1]$, $D_{bc}=[0]$, p=bc, $C_{bc}$ is a coefficient matrix of the bypass loop voltage equation when the bc phase bypass, and $D_{bc}$ is a constant vector of the bypass loop voltage equation when the bc phase bypass;

S83. when the number of bypass phases $S_{total}=3$, it indicates that three phase bypass pairs of the converter valves operate, supplementing the bypass loop voltage equation $C_p i=D_p$, skip to step S92; at the same time, a following relationship exists:

$$\begin{cases} i_{VT1} + i_{VT4} = i_{VT3} + i_{VT6} \\ i_{VT1} + i_{VT4} = i_{VT2} + i_{VT5} \end{cases} \quad (G11)$$

supplementing the bypass loop voltage equation $C_{abc}i=D_{abc}$, wherein $C_{abc}=$ $$\begin{bmatrix} 1 & -1 & 0 & 1 & -1 & 0 \\ 1 & 0 & -1 & 1 & 0 & -1 \end{bmatrix},$$

$D_{abc}=[0\ 0]^T$, p=abc, $C_{abc}$ is a coefficient matrix of the bypass loop voltage equation when the abc phases bypass, $D_{abc}$ is a constant vector of the bypass loop voltage equation when the abc phases bypass;

processes of step S9 are as follows:

S91. constructing a state equation based on valve state characteristics $ASi=y$, inverting its coefficient matrix to calculate the valve current $i_{VTm}$:

$$i=(AS)^{-1} \times y \quad (G12)$$

in the formula (G12): $i=[i_{VT1}\ i_{VT2}\ i_{VT3}\ i_{VT4}\ I_{VT5}\ i_{VT6}]^T$;

S92. combining $Ai=y$ and $C_p i=D_p$, combining the valve state characteristics S to construct a state equation $ESi=z$, inverting its coefficient matrix, and calculating the valve current $i_{VTm}$:

$$i=(ES)^{-1} \times x \quad (G13)$$

in the formula (G13): $i=[i_{VT1}\ i_{VT2}\ i_{VT3}\ i_{VT4}\ i_{VT5}\ i_{VT6}]^T$, $$E=\begin{bmatrix} A \\ C_p \end{bmatrix}, z=\begin{bmatrix} y \\ D_p \end{bmatrix},$$

p is a serial number of a bypass phase, E is a coefficient matrix formed by the coefficient matrix A and the coefficient matrix $C_p$, z is a vector formed by the current vector y and the constant vector $D_p$ at both ends of the valve side.

4. The calculation method for a converter valve state and a valve current based on temporal features of a valve side current according to claim 1, characterized in that, in step S3, when a rising edge of a trigger pulse of a converter valve is detected $FP_m(t)-FP_m(t-\Delta t)=1$, latching the number m of the converter valve into the register; wherein $FP_m(t)$ is a trigger pulse signal of the converter valve numbered m at time t, $FP_m(t-\Delta t)$ is a trigger pulse signal of the converter valve numbered m at time $(t-\Delta t)$, t is a time at a certain moment, $\Delta t$ is a sampling time interval.

* * * * *

UNITED STATES PATENT AND TRADEMARK OFFICE
CERTIFICATE OF CORRECTION

PATENT NO. : 12,126,246 B2
APPLICATION NO. : 18/036537
DATED : October 22, 2024
INVENTOR(S) : Xiaohua Li et al.

It is certified that error appears in the above-identified patent and that said Letters Patent is hereby corrected as shown below:

In the Claims

Column 13, Line 35, Claim 1, insert --A-- before "is a valve current coefficient"

Column 13, Line 44, Claim 1, delete "FP2, FP2, FP4" and insert --FP2, FP3, FP4--

Column 14, Line 47, Claim 2, insert a --$_k$-- after "|i"

Column 16, Line 33, Claim 3, delete the "T" in this equation "=[0 0]T" and insert --$_T$--

Column 16, Line 49, Claim 3, delete the "xx" before "(G13)" and insert --xz--

Signed and Sealed this
Twenty-fifth Day of March, 2025

Coke Morgan Stewart
*Acting Director of the United States Patent and Trademark Office*